United States Patent Office 3,787,536
Patented Jan. 22, 1974

3,787,536
3-PHOSPHORYLTHIO ACRYLAMIDES
Horst O. Bayer, Levittown, and William S. Hurt and Harold E. Aller, Norristown, Pa., assignors to Rohm and Haas Company, Philadelphia, Pa.
No Drawing. Continuation-in-part of application Ser. No. 162,010, July 12, 1971, which is a continuation-in-part of application Ser. No. 22,660, Mar. 25, 1970, which in turn is a continuation-in-part of application Ser. No. 807,445, Mar. 14, 1969, both now abandoned. This application Dec. 21, 1971, Ser. No. 210,619
Int. Cl. A01n 9/36; C07f 9/16
U.S. Cl. 260—943
11 Claims

ABSTRACT OF THE DISCLOSURE

New compounds belonging to the general class of 3-phosphorylthio acrylamides. They can be prepared by reaction of a phosphorous acid derivative with an isothiazolone hydrochloride. They are broad spectrum insecticides, miticides and nematocides.

---

This application is a continuation-in-part of U.S. Ser. No. 162,010, filed July 12, 1971 which is a continuation-in-part of U.S. Ser. No. 22,660, filed Mar. 25, 1970, now abandoned which in turn is a continuation-in-part of U.S. Ser. No. 807,445, filed Mar. 14, 1969, now abandoned. This invention is concerned with 3-phosphorylthio acrylamides of the general formula

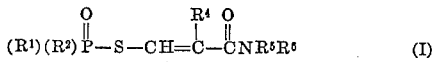

wherein $R^1$ and $R^2$ are individually selected from the group RO or RS wherein R is alkyl or haloalkyl of 1 to 5 carbon atoms or alkenyl of 3 to 5 carbon atoms, or the group $R'R''N$ wherein $R'$ and $R''$ are individually selected from alkyl groups of 1 to 5 carbon atoms;
$R^4$ is hydrogen, halogen or alkyl of 1 to 5 carbon atoms;
$R^5$ and $R^6$ are individually selected from
  (a) hydrogen,
  (b) alkyl of 1 to 12 carbon atoms,
  (c) alkyl of 1 to 12 carbon atoms substituted with halogen, cyano, hydroxy, alkoxy, alkylthio, carboalkoxy groups of 1 to 5 carbon atoms, phenyl, morpholinyl, anilino or anilino substituted with halogen or nitro,
  (d) alkenyl of 3 to 12 carbon atoms,
  (e) alkynyl of 3 to 12 carbon atoms,
  (f) cycloalkyl of 3 to 6 carbon atoms,
  (g) phenyl,
  (h) phenyl substituted with halogen, alkyl of 1 to 5 carbon atoms, nitro or alkyl sulfonyl wherein the alkyl group is 1 to 5 carbon atoms,
  (i) benzyl,
  (j) benzyl substituted with halogen, alkyl of 1 to 5 carbon atoms or nitro,
  (k) alkoxy of 1 to 5 carbon atoms,
  (l) the carbamyl group —C(X)NHR$^7$, wherein X is oxygen or sulfur, and $R^7$ is alkyl of 1 to 12 carbon atoms,
  (m) the —C(O)R$^8$ group wherein $R^8$ is
    (1) hydrogen,
    (2) alkyl of 1 to 5 carbon atoms,
    (3) alkyl of 1 to 5 carbon atoms substituted with halogen, thiocyano, alkoxy of 1 to 5 carbon atoms, alkylthio of 1 to 5 carbon atoms, $C_1$ to $C_5$ alkoxy carbonyl, thiolacetyl, a benzyloxy group, a benzylthio group, phenyl, a phenoxy group, or a phenylthio group,
    (4) alkenyl of 2 to 5 carbon atoms,
    (5) alkenyl of 2 to 5 carbon atoms substituted with $C_1$ to $C_5$ alkoxy carbonyl,
    (6) alkoxy of 1 to 5 carbon atoms,
    (7) $C_1$ to $C_5$ alkoxy carbonyl, or
    (8) phenyl, with the proviso that only one of $R^5$ or $R^6$ can be an alkoxy, the —C(X)NHR$^7$ or the —C(O)R$^8$ group, and
  (n) $R^5$ and $R^6$ taken together with the nitrogen to which they are attached are the pyrrolidinyl, piperidino, morpholino, or the thiomorpholino group;

It is understood that all the hydrocarbyl groups defined above may be straight-chained or branched.

These compounds exist as geometrical isomers and can be in the cis form

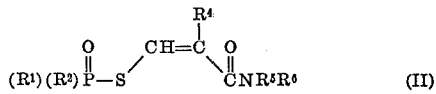

or the trans form

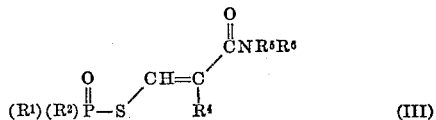

or mixtures of these. The compounds where $R^1$ and $R^2$ are alkoxy and the cis stereoisomers are preferred as insecticides and miticides.

Compounds having the structure of Formula I have not heretofore been reported in the literature. The most closely related commercial insecticides are known by the trademarked names Azodrin and Bidrin. Azodrin has the structure

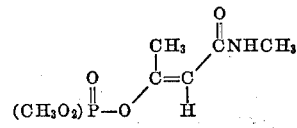

and Bidrin the structure

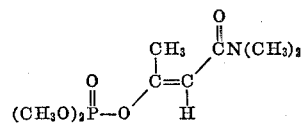

Literature references on these structures include U.S. Pat. 2,802,855 and S. C. Lau, J. Ag. Food Chem. 14, 145 (1966). It is to be noted that for these structures the most insecticidally active forms are considered to be the trans isomers with respect to the phosphoryl and carbonyl groups.

Japanese patent publication 636/65 discloses insecticidal properties for the compound

The insecticidal properties of esters of the general formula

have been described in British Pat. 892,326 and U.S. Pat. 3,059,014. The insecticidal properties of enol phosphates of the structure

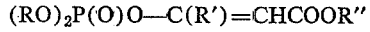

have been reviewed in Chemical Reviews 61, 631 (1961).
U.S. Pat. 3,577,481 discloses insecticidal and miticidal properties for compounds of the structure

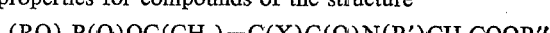

The cis-3-phosphorylthio acrylamides of Formula II wherein $R^6$ is hydrogen,

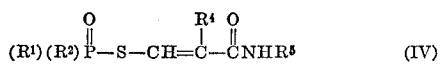
(IV)

may be prepared by reacting a phosphite of the structure $(R^1)(R^2)$ POR with an isothiazolone hydrohalide, preferably a hydrochloride, in accordance with the following equation

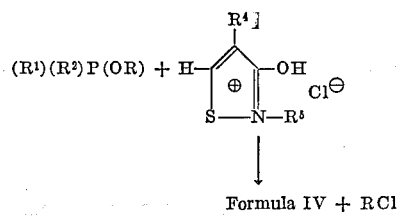

Formula IV + RCl wherein R, $R^1$, $R^2$, $R^4$ and $R^5$ have the meanings given above. Note that for this reaction to proceed, it is necessary that there be at least one alkoxy or alkenyloxy, i.e. RO, group in the starting phosphite. In this regard the above type reaction is similar to the so-called Perkow reaction, for which see Chemical Reviews 61, 609 (1961).

The isothiazolone starting materials are known. The isothiazolones may be made by the cyclization of a disulfide amide of the formula

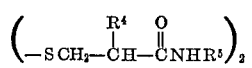

wherein $R^4$ and $R^5$ have the above designations. A typical cyclizing agent is at least three mole equivalents of a halogenating agent such as chlorine, bromine or sulfuryl chloride. The reaction is conveniently carried out in an inert solvent, such as ethyl acetate and at 20°–50° C. temperature. In some instances it is convenient to isolate the hydrohalide salt, such as the hydrochloride, from the reaction mixture and use it directly for reaction with a trialkyl or some other phosphite. In other cases it is more convenient to isolate the isothiazolone, for example by careful neutralization or by solvent extraction from an aqueous solution of the hydrohalide salt.

The trialkyl or trialkenyl phosphite starting materials are known compounds, a listing of which may be found in G. M. Kosolapoff's Organophosphorus Compounds, J. Wiley & Sons, New York, 1950. Similarly, the analogous thiophosphites, dithiophosphites and phosphorodiamidites are known compounds.

The isothiazolone hydrochloride may be prepared separately and isolated or may be formed in situ by the addition of some form of hydrogen chloride such as gaseous HCl or hydrochloric acid. Other hydrohalide salts may also be used.

The reaction of the isothiazolone hydrochloride with the phosphite is most often carried out in the presence of an inert solvent, e.g. an ester such as ethyl acetate, an aromatic hydrocarbon such as benzene or a chlorinated solvent such as chloroform. The ester type solvent is preferred. Equimolar amounts of the two reactants are preferred; however, an excess of the phosphite up to two equivalents may be used. The reaction may conveniently be run in the range of 0° to 100° C., preferably 20°–40° C.

The cis-form of the compounds of Formula II for which $R^4$ is hydrogen may be prepared as the major product by the addition of a thiolophosphoric acid of the formula $R^1(R^2)P(O)SH$ to a propiolamide according to the following equation $R^1(R^2)P(O)SH + HC\equiv C-C(O)NR^5R^6 \longrightarrow$

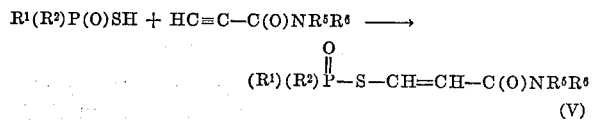
(V)

wherein $R^1$, $R^2$, $R^5$ and $R^6$ have the meanings given above.

A related reaction involving the addition of esters of thiolophosphoric acid to propiolates is known from U.S. Pat. 3,059,014 and British Pat. 892,326.

The addition of a bis-ester or amide of a thiolophosphoric acid to a propiolamide is preferably carried out in the presence of an inert solvent, e.g. a nitrile such as acetonitrile or an aromatic hydrocarbon such as benzene. The reaction proceeds at a temperature range of 20°–100° C., preferably 50°–100° C. Equimolar quantities of the two reactants may be used, but a 10 to 20% excess of the thiolophosphoric acid derivative is preferred since the ester or amide can react with itself. Excesses up to two equivalents may be used.

The cis-isomers of these compounds (Formula II) can be converted to the trans-isomers (Formula III) by classical means.

A photochemical cis/trans isomerization of the compound of Example 20 by irradiation with a 550-watt high pressure mercury arc rapidly resulted in a photostationary state. The resulting product was 65% trans-3-diethoxyphosphorylthio-N-ethyl-acrylamide and 35% of the corresponding cis-isomer. These can be separated by fractional crystallization.

The following series of reactions may be used to prepare the trans-isomer for a compound where $R^4$ is halogen. This is exemplified for the case where $R^4$ is bromine.

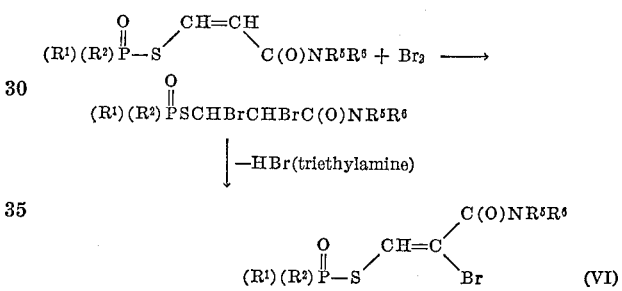

The transformation from cis to trans isomers may be followed by means of the NMR spectra.

Tables I, II and III give examples of compounds of Formula I and their characterization. Specific illustrative preparations of Example 1, 12, 20, 37, 69, 73, 74, 75, 110 and 111 are set forth below.

Table IV lists the isothiazolones used in the examples given and characteristic melting or boiling point.

EXAMPLE 1

Preparation of cis-3-dimethoxyphosphorylthio-acrylamide

To a slurry of 13.75 g. (0.1 mole) of 3-hydroxyisothiazole hydrochloride in 300 ml. of ethyl acetate was added dropwise 12.4 g. (0.1 mole) of trimethyl phosphite in 20 ml. of ethyl acetate. A slight exotherm occurred. The mixture was stirred two hours as most of the solid went into solution. The reaction mixture was filtered to remove 5.1 g. of oily solid, mainly the starting hydrochloride. The filtrate was concentrated to give 17 g. of pale yellow oil. The oil was crystallized from 25 ml. of chloroform to give 6.8 g. of solid melting at 111.5°–113.5° C. This is a 34 percent yield of cis-3-dimethoxy-phosphorylthio-acrylamide.

EXAMPLE 12

Preparation of cis-3-diethoxyphosphorylthio-2-methyl-N-methyl-acrylamide (a) Preparation of 2,4-dimethyl-3-isothiazolone hydrochloride.—A solution of 19.3 g. (0.073 mole) of dithio-dimethyldiisobutyramide in 300 ml. of ethyl acetate was heated to 45° C. There was added dropwise 29.7 g. (0.22 mole) of sulfuryl chloride in one hour at about 45° C. The mixture was stirred 3 hours. The resulting solid was filtered off, washed with ethyl acetate and vacuum dried to give 15.2 g. of white crystalline solid. By infrared spectroscopy and NMR, this was shown to be 2,4-dimethyl-3-isothiazolone hydrochloride.

(b) Preparation of cis - 3 - diethoxyphosphorylthio-2-methyl-N-methylacrylamide.—To a slurry of 6.62 g. (0.04 mole) of 2,4-dimethyl-3-isothiazolone hydrochloride in 150 ml. of ethyl acetate was added dropwise 6.65 g. (0.04 mole) of triethyl phosphite in 10 ml. of ethyl acetate. There was a slight exotherm. The mixture was stirred 1.5 hours and was then filtered to remove a trace of insoluble material. The filtrate was concentrated on a rotary evaporator to give 10.9 g. of pale yellow oil. The infrared spectrum was consistent with the desired product and NMR confirmed the structure. The oil was crystallized from a mixture of 10 ml. of ethyl acetate and 20 ml. of ether to give 5.0 g. of colorless cubes melting at 52°–55° C.

EXAMPLE 20

Preparation of cis-3-diethoxyphosphorylthio-N-ethylacrylamide

To a slurry of 4.97 g. (0.03 mole) of 2-ethyl-3-isothiazolone hydrochloride in 150 ml. of ethyl acetate with stirring was added a solution of 4.98 g. (0.03 mole) of triethyl phosphite in 10 ml. of ethyl acetate dropwise in 20 minutes. A slight exotherm raised the temperature from 22° C. to 30° C. Stirring was continued for 1 hour to give a clear solution. The reaction mixture was concentrated in vacuo to give 8.3 g. of pale yellow crystalline solid. The product was recrystallized from ethyl acetate to give 5.3 g. (67% yield) of cis-3-diethoxyphosphorylthio-N-ethylacrylamide.

EXAMPLE 37

Preparation of cis-3-ethoxy(methoxy)phosphorylthio-N-cyclopropyl-acrylamide (a) Preparation of dimethyl ethyl phosphite.—To 46 g. (1.0 mole) of absolute ethanol was added 0.5 g. of sodium metal and the mixture was stirred until the sodium dissolved. To this was added 124 g. (1.0 mole) of trimethyl phosphite. The solution was distilled slowly at a vapor temperature range of 64° to 69° C. as 40 g. of methanol (identified by NMR) was removed. The residue was distilled through a 20-inch, 16-plate Oldershaw column to give a main fraction distilling at 68° to 72° C. at 85–89 mm. pressure. By vapor phase chromatography this was determined to be 98% dimethyl ethyl phosphite and 2% trimethyl phosphite.

(b) Reaction of dimethyl ethyl phosphite with 2-cyclopropyl-3-isothiazolone hydrochloride.—A slurry of 7.1 g. (0.04 mole) of 2-cyclopropyl-3-isothiazolone hydrochloride in 150 ml. of ethyl acetate was stirred and cooled in an ice bath as there was added dropwise in 10 minutes a solution of 5.8 g. (0.042 mole) of dimethyl ethyl phosphite in 10 ml. of ethyl acetate. The mixture was stirred one hour and a clear solution resulted. The reaction mixture was concentrated to give 11.0 g. of a pale green crystalline solid. This was recrystallized from 12 ml. of ethyl acetate to give 8.2 g. of pale green crystals identified as cis-3-ethoxy(methoxy)-phosphorylthio-N-cyclopropyl-acrylamide.

EXAMPLE 69

Preparation of cis-3-dimethoxyphosphorylthio-N-(methylcarbamoyl acrylamide)

Into a round bottom flask was placed 6.32 g. (0.04 mole) of 2-methylcarbamoyl-3-isothiazolone, 4.0 g. (0.04 mole) of concentrated hydrochloric acid and 200 ml. of ethyl acetate. The resulting slurry was stirred magnetically as there was added dropwise a solution of 4.96 g. (0.04 mole) of trimethyl phosphite in 10 ml. of ethyl acetate. A slight exotherm resulted in a rise in temperature of 5° C. The reaction mixture was stirred two hours longer. A solid residue was filtered off and amounted to 2.8 g. which melted at 161°–164° C. The filtrate was concentrated to give a solid which after washing with ethyl acetate was 5 g. melting at 162°–163° C. The ethyl acetate washing was concentrated to give 1 g. of solid. By infrared spectra all three crops of solid were determined to be the same and NMR confirmed these to be cis-3-dimethoxyphosphorylthio-N-(methylcarbamoyl)acrylamide.

EXAMPLE 73

Preparation of cis-3-ethoxy(ethylthio)phosphorylthio-N-ethylacrylamide

A slurry of 2-ethyl-3-isothiazolone hydrochloride, 6.6 g. (0.04 mole) in 150 ml. of ethyl acetate was charged to a 300 ml. round bottom flask. To this was added dropwise in about 15 minutes at room temperature and with stirring a solution of 8 g. (0.044 mole) of O,O,S-triethylthiophosphite in 20 ml. of ethyl acetate. The mixture was stirred 2 hours at room temperature and most of the solid had gone into solution. The reaction mixture was filtered to remove 0.7 g. of insoluble solid and the filtrate was concentrated to give 12.9 g. of yellow oil. The oil was purified by chromatographing on silica gel, first using an acetone-hexane solution followed by an acetone-pentane solution. There was isolated from the purified main fraction 4.3 g. of colorless oil. By NMR its structure was confirmed to be cis-3-[(ethoxy)(ethylthio)phosphorylthio]-N-ethylacrylamide.

EXAMPLE 74

Preparation of cis-3-dimethylamido(methoxy)phosphorylthio-N-ethylacrylamide

To a slurry of 3.3 g. (0.02 mole) of 2-ethyl-3-isothiazolone hydrochloride in 75 ml. of ethyl acetate was added in 15 minutes at room temperature a solution of 2.74 g. (0.02 mole) of dimethyl N,N-dimethylphosphoramidite in 10 ml. of ethyl acetate. The reaction mixture was stirred 2 hrs. at room temperature, filtered to remove a slight amount of solid and the filtrate concentrated to give 5 g. of a red oil. The oil was purified by chromatographing an acetone-hexane solution on silica gel. The major fraction was concentrated to give 4 g. of pale yellow oil. By analysis and NMR this was found to cis-3-[(dimethylamido)(methoxy)phosphorylthio] - N - ethylacrylamide of about 90% purity.

EXAMPLE 75

Preparation of cis-3-dimethoxyphosphorylthio-N-formylacrylamide

To a slurry of 2-formyl-3-isothiazolone (5.16 g., 0.04 mole) and concentrated hydrochloric acid (4 g., 0.04 mole) in 200 ml. of ethyl acetate was added dropwise trimethyl phosphite (4.96 g., 0.04 mole) in 10 ml. of ethyl acetate. There was a slight exotherm. The mixture was stirred 1 hour and was then filtered to remove insoluble impurities. The filtrate was concentrated to give an oil-solid mixture which was taken up in ethyl acetate. After standing overnight at 0° C. there was obtained 1.3 g. of a crystallinesolid melting at 104–106° C. This is a 13% yield of cis-3 - dimethoxyphosphorylthio-N-formylacrylamide.

EXAMPLE 110

Preparation of trans-3-diethoxyphosphorylthio-2-bromo-N-ethyl-acrylamide (a) Preparation of 3 - diethoxyphosphorylthio-2,3-dibromo-N-ethylpropionamide.—A solution of 2.67 g. (0.01 mole) of cis-3-diethoxyphosphorylthio-N-ethylacrylamide in 50 ml. of chloroform was cooled to 0° C. To this was added dropwise 1.6 g. (0.01 mole) of bromine in 10 ml. of chloroform. The solution slowly decolorized. After stirring overnight at room temperature, the reaction mixture was concentrated to give 4.3 g. of solid melting at 64°–67° C. This was a 100% yield of 3-diethoxyphosphorylthio-2,3 - dibromo-N-ethylpropionamide. Its structure was confirmed by infrared and NMR spectra.

(b) Preparation of trans - 3 - diethoxyphosphorylthio-2-bromo-N-ethylacrylamide.—To 8.6 g. (0.02 mole) of 3-diethoxyphosphorylthio-2,3-dibromo - N - ethylpropionamide in 100 ml. of acetone was added 2.0 g. (0.02 mole) of triethylamine in 10 ml. of acetone. After stirring for 2 hours NMR showed the reaction to be 68% complete. Another portion of 0.7 g. (0.007 mole) of triethylamine was added and the reaction mixture stirred overnight. The reaction mixture was filtered to remove 3.3 g. of triethylamine hydrobromide. The filtrate was concentrated to give 5.4 g. of yellow-brown oil. By NMR this was shown to be trans-3 - diethoxyphosphorylthio-2-bromo-N-ethylacrylamide having a one proton vinyl doublet at 8.1 p.p.m. The corresponding cis isomer had a one proton vinyl doublet at 7.3 p.p.m.

EXAMPLE 111

Preparation of cis-3-dimethoxyphosphorylthio-N,N-dimethylacrylamide

To a solution of 4.85 g. (0.05 mole) of N,N-dimethylpropiolamide in 25 ml. of acetonitrile was added 7.8 g. (0.055 mole) of O,O-dimethylthiolophosphoric acid. The solution was refluxed for 3 hours. The solvent was removed, the residue taken up in 150 ml. of chloroform, washed twice with 25 ml. portions of water, dried and concentrated under high vacuum to give 7.5 g. of a red oil. An ethyl acetate solution of this was chromatographed on 40 g. of silica gel to give 6.9 g. of light yellow oil. This was crystallized from a mixture of 5 ml. of ethyl acetate and 10 ml. of ether to give 3.2 g. of crystals melting at 41°–43° C. By NMR this was shown to be cis-3-dimethoxyphosphorylthio-N,N-dimethylacrylamide.

Certain of the compounds of Formula IV can also be prepared by reaction of a dialkyl phosphite,

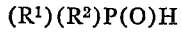

wherein $R^1$ and $R^2$ are alkoxy, with an isothiazolone of the formula

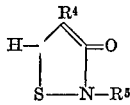

in the presence of a basic catalyst.

A preferred group of compounds is exemplified by the general formula

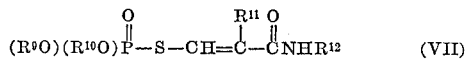 (VII)

wherein $R^9$ and $R^{10}$ are individually methyl or ethyl,
$R^{11}$ is hydrogen or methyl, and
$R^{12}$ is
  (a) alkyl of 1 to 5 carbon atoms, or
  (b) the —C(O)$R^8$ group wherein $R^8$ is
    (1) hydrogen
    (2) alkyl of 1 to 5 carbon atoms,
    (3) alkyl of 1 to 5 carbon atoms substituted with halogen, thiocyano, alkoxy of 1 to 5 carbon atoms, alkylthio of 1 to 5 carbon atoms, $C_1$ to $C_5$ alkoxy carbonyl, thiolacetyl, a benzyloxy group, a benzylthio group, phenyl, a phenoxy group, or a phenylthio group,
    (4) alkenyl of 2 to 5 carbon atoms,
    (5) alkenyl of 2 to 5 carbon atoms substituted with $C_1$ to $C_5$ alkoxy carbonyl,
    (6) alkoxy of 1 to 5 carbon atoms,
    (7) $C_1$ to $C_5$ alkoxy carbonyl, or
    (8) phenyl.

When $R^8$ in Formula VII is an alkyl group substituted with a benzyloxy, benzylthio, phenoxy or phenylthio group this is intended to include substitutents on the benzyl or phenyl groups such as alkyl of 1 to 5 carbons, alkoxy of 1 to 5 carbon atoms, alkylthio of 1 to 5 carbon atoms, $C_1$–$C_5$-alkoxy carbonyl, bromo, chloro, fluoro, trifluoromethyl, cyano, methylsulfonyl, nitro, and the —$NR^{13}R^{14}$ group wherein $R^{13}$ is hydrogen or alkyl of 1 to 5 carbon atoms and $R^{14}$ is hydrogen, alkyl of 1 to 5 carbon aotms or acetyl. The following specific compounds exemplify this:

3-dimethoxyphosphorylthio-N-(2-methoxybenzyloxyacetyl)acrylamide
3-diethoxyphosphorylthio-N-(2-methylthiobenzyloxyacetyl)acrylamide
3-dimethoxyphosphorylthio-N-(2,6-dichlorobenzyloxyacetyl)acrylamide
3-dimethoxyphosphorylthio-N-(3,4-dichlorobenzyloxyacetyl)acrylamide
3-(ethoxy)(methoxy)phosphorylthio-N-3-cyanobenzyloxyacetyl)acrylamide
3-dimethoxyphosphorylthio-N-(4-methylbenzyloxyacetyl)acrylamide
3-dimethoxyphosphorylthio-N-(3-nitrobenzyloxyacetyl)acrylamide
3-dimethoxyphosphorylthio-N-(4-methylsulfonylbenzyloxyacetyl)acrylamide
3-dimethoxyphosphorylthio-N-(4-methoxybenzylthioacetyl)acrylamide
3-dimethoxyphosphorylthio-N-(4-methylthiobenzylthioacetyl)acrylamide
3-dimethoxyphospholylthio-N-(4-fluorobenzylthioacetyl)acrylamide
3-dimethoxyphosphorylthio-N-(4-chlorobenzylthioacetyl)acrylamide
3-dimethoxyphosphorylthio-N-(4-cyanobenzylthioacetyl)acrylamide
3-dimethoxyphosphorylthio-N-(4-methylbenzylthioacetyl)acrylamide
3-dimethoxyphosphorylthio-N-(4-nitrobenzylthioacetyl)acrylamide
3-dimethoxyphosphorylthio-N-(2,4-dichlorobenzylthioacetyl)acrylamide
3-dimethoxyphosphorylthio-N-(2,4,6-trichlorobenzylthioacetyl)acrylamide
3-dimethoxyphosphorylthio-N-(4-chloro-2-methylbenzylthioacetyl)methacrylamide
3-dimethoxyphosphorylthio-N-(4-dimethylaminobenzylthioacetyl)acrylamide
3-diethoxyphosphorylthio-N-(3-trifluoromethylbenzylthioacetyl)acrylamide
3-dimethoxyphosphorylthio-N-(4-butoxyphenoxyacetyl)methacrylamide
3-dimethoxyphosphorylthio-N-(4-methylthio-3-methylphenoxyacetyl)methacrylamide
3-dimethoxyphosphorylthio-N-(2-bromophenoxyacetyl)methacrylamide
3-dimethoxyphosphorylthio-N-(2-chlorophenoxyacetyl)methacrylamide
3-dimethoxyphosphorylthio-N-(3-methoxyphenoxyacetyl)methacrylamide
3-dimethoxyphosphorylthio-N-(2,4-dimethylphenoxyacetyl)methacrylamide
3-dimethoxyphosphorylthio-N-3-(2-isopropylphenoxypropionyl)methacrylamide
3-dimethoxyphosphorylthio-N-(4-chloro-2-nitrophenoxybutyryl)methacrylamide
3-dimethoxyphosphorylthio-N-5-(3,5-dimethylphenoxypentanoyl)methacrylamide
3-dimethoxyphosphorylthio-N-(2-cyanophenoxyacetyl)acrylamide
3-dimethoxyphosphorylthio-N-(2-methylphenoxyacetyl)acrylamide
3-dimethoxyphosphorylthio-N-(3-methylphenoxyacetyl)acrylamide
3-dimethoxyphosphorylthio-N-(4-methyl-2-nitrophenoxyacetyl)acrylamide 3-dimethoxyphosphorylthio-N-(2-nitro-4-cyanophenoxyacetyl)acrylamide
3-dimethoxyphosphorylthio-N-(4-aminophenoxyacetyl)acrylamide
3-dimethoxyphosphorylthio-N-(4-methoxycarbonylphenoxyacetyl)acrylamide
3-dimethoxyphosphorylthio-N-(4-methoxyphenylthioacetyl)acrylamide
3-dimethoxyphosphorylthio-N-(4-bromophenylthioacetyl)acrylamide
3-dimethoxyphosphorylthio-N-(2,5-dichlorophenylthioacetyl)acrylamide
3-dimethoxyphosphorylthio-N-(4-cyanophenylthioacetyl)acrylamide
3-dimethoxyphosphorylthio-N-(4-t-butylphenylthioacetyl)acrylamide
3-dimethoxyphosphorylthio-N-(4-nitrophenylthioacetyl)acrylamide
3-dimethoxyphosphorylthio-N-(4-acetamidophenylthioacetyl)acrylamide

TABLE I

Cis-(phosphorylthio) acrylamides

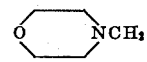

| Example No. | $R^1$ | $R^2$ | $R^4$ | $R^5$ | Melting point, °C. |
|---|---|---|---|---|---|
| 1 | $CH_3O$ | $CH_3O$ | H | H | 111.5–113.5 |
| 2 | $CH_3O$ | $CH_3O$ | $CH_3$ | H | 126–128 |
| 3 | $CH_3O$ | $CH_3O$ | Br | H | 88–91 |
| 4 | $CH_3O$ | $C_2H_5O$ | H | H | 118–121 |
| 5 | $C_2H_5O$ | $C_2H_5O$ | H | H | 111–113.5 |
| 6 | iso-$C_3H_7O$ | Iso-$C_3H_7O$ | H | H | 112–114 |
| 7 | Allyl-O | Allyl-O | H | H | 79–81 |
| 8 | $CH_3O$ | $CH_3O$ | H | $CH_3$ | 69.5–71.0 |
| 9 | $CH_3O$ | $CH_3O$ | $CH_3$ | $CH_3$ | 65–68 |
| 10 | $CH_3O$ | $C_2H_5O$ | $CH_3$ | $CH_3$ | 49–51 |
| 11 | $C_2H_5O$ | $C_2H_5O$ | H | $CH_3$ | Ca. 25 |
| 12 | $C_2H_5O$ | $C_2H_5O$ | $CH_3$ | $CH_3$ | 52–55 |
| 13 | $CH_3O$ | $CH_3O$ | H | $O\!\!\diagdown\!\!N\text{-}CH_3$ (morpholinyl) | 128–30 |
| 14 | $CH_3O$ | $CH_3O$ | H | 4-$ClC_6H_4NHCH_2$ | 126–128 |
| 15 | $CH_3O$ | $CH_3O$ | H | 4-$O_2NC_6H_4NHCH_2$ | 151–153 |
| 16 | $CH_3O$ | $CH_3O$ | H | $C_2H_5$ | 77–78 |
| 17 | $CH_3O$ | $C_2H_5O$ | $CH_3$ | $C_2H_5$ | 98.5–100 |
| 18 | $CH_3O$ | $C_2H_5O$ | H | $C_2H_5$ | 62–63.5 |
| 19 | $CH_3O$ | n-$C_3H_7O$ | H | $C_2H_5$ | Oil |
| 20 | $C_2H_5O$ | $C_2H_5O$ | H | $C_2H_5$ | 75–76 |
| 21 | $C_2H_5O$ | $C_2H_5O$ | $CH_3$ | $C_2H_5$ | Oil |
| 22 | $CH_3O$ | $CH_3O$ | $C_2H_5$ | $C_2H_5$ | 61–63 |
| 23 | $CH_3O$ | $CH_3O$ | n-$C_4H_9$ | $CH_3$ | Oil |
| 24 | $C_2H_5O$ | $C_2H_5O$ | Br | $C_2H_5$ | 49–53 |
| 25 | $CH_3O$ | $CH_3O$ | H | —$CH_2CH_2Cl$ | 66–70 |
| 26 | $C_2H_5O$ | $C_2H_5O$ | H | —$CH_2CH_2Cl$ | 45–50 |
| 27 | $CH_3O$ | $CH_3O$ | H | —$CH_2CH_2OCH_3$ | Oil |
| 28 | $CH_3O$ | $CH_3O$ | H | —$CH_2CH_2SC_2H_5$ | 60–65 |
| 29 | $CH_3O$ | $CH_3O$ | H | —$CH_2CH_2CN$ | 83–85 |
| 30 | $CH_3O$ | $CH_3O$ | H | —$CH_2CH_2C_6H_5$ | 100–102 |
| 31 | $CH_3O$ | $CH_3O$ | H | n-$C_3H_7$ | 63–64 |
| 32 | $C_2H_5O$ | $C_2H_5O$ | H | n-$C_3H_7$ | 49–50 |
| 33 | $CH_3O$ | $CH_3O$ | H | Iso-$C_3H_7$ | 92–93 |
| 34 | $C_2H_5O$ | $C_2H_5O$ | H | Iso-$C_3H_7$ | 82–84 |
| 35 | $CH_3O$ | $CH_3O$ | $CH_3$ | Iso-$C_3H_7$ | 114–116 |
| 36 | $CH_3O$ | $CH_3O$ | H | Cyclopropyl | 107.5–108.5 |
| 37 | $CH_3O$ | $C_2H_5O$ | H | Cyclopropyl | 84–86 |
| 38 | $C_2H_5O$ | $C_2H_5O$ | H | Cyclopropyl | 91–94 |
| 39 | $CH_3O$ | $CH_3O$ | H | n-$C_4H_9$ | 66–67.5 |
| 40 | $CH_3O$ | $CH_3O$ | H | sec-$C_4H_9$ | 94–95 |
| 41 | $CH_3O$ | $CH_3O$ | $CH_3$ | Sec-$C_4H_9$ | 99–100.5 |
| 42 | $CH_3O$ | $CH_3O$ | H | t-$C_4H_9$ | 134.5–135.5 |
| 43 | $CH_3O$ | $CH_3O$ | $CH_3$ | t-$C_4H_9$ | 91–93 |
| 44 | $CH_3O$ | $CH_3O$ | H | n-$C_5H_{11}$ | 65–67.5 |
| 45 | $CH_3O$ | $CH_3O$ | H | $(C_2H_5)_2CH$ | 78–80 |
| 46 | $CH_3O$ | $CH_3O$ | $CH_3$ | $(C_2H_5)_2CH$ | 73–75 |
| 47 | $CH_3O$ | $CH_3O$ | H | (n-$C_3H_7$)($CH_3$)CH | 62–65 |
| 48 | $CH_3O$ | $CH_3O$ | $CH_3$ | (n-$C_3H_7$)($CH_3$)CH | Oil |
| 49 | $CH_3O$ | $CH_3O$ | H | Cyclopentyl | 106–110 |
| 50 | $CH_3O$ | $CH_3O$ | H | n-$C_6H_{13}$ | 47–50 |
| 51 | $CH_3O$ | $CH_3O$ | H | Cyclohexyl | 149–151.5 |
| 52 | $CH_3O$ | $CH_3O$ | H | t-$C_8H_{17}$ | 118–120 |
| 53 | $C_2H_5O$ | $C_2H_5O$ | H | t-$C_8H_{17}$ | 74–75.5 |
| 54 | $CH_3O$ | $CH_3O$ | H | Allyl | Ca. 25 |
| 55 | $CH_3O$ | $CH_3O$ | H | —$CH_2C_6H_5$ | 116.5–118.6 |
| 56 | $CH_3O$ | $CH_3O$ | H | —$CH_2C_6H_4Cl$-4 | 97–98.5 |
| 57 | $C_2H_5O$ | $C_2H_5O$ | H | —$CH_2C_6H_4Cl$-4 | 44–47 |
| 58 | $CH_3O$ | $CH_3O$ | H | $C_6H_5$ | 114–116 |
| 59 | $CH_3O$ | $CH_3O$ | $CH_3$ | $C_6H_5$ | 108–110 |
| 60 | $CH_3O$ | $CH_3O$ | H | —$C_6H_4Cl$-2 | 137–41 |
| 61 | $CH_3O$ | $CH_3O$ | H | —$C_6H_4Cl$-3 | 119–21 |
| 62 | $CH_3O$ | $CH_3O$ | H | —$C_6H_4Cl$-4 | 157–60 |
| 63 | $CH_3O$ | $CH_3O$ | H | —$C_6H_4CH_3$-2 | 156–158 |
| 64 | $CH_3O$ | $CH_3O$ | H | —$C_6H_4CH_3$-4 | 143–145 |
| 65 | $CH_3O$ | $CH_3O$ | $CH_3$ | —$C_6H_4CH_3$-4 | 119–123 |
| 66 | $CH_3O$ | $CH_3O$ | H | —$C_6H_4NO_2$-4 | [1] 200–6 |
| 67 | $CH_3O$ | $CH_3O$ | H | —$C_6H_4SO_2CH_3$ | 166–68 |
| 68 | $CH_3O$ | $CH_3O$ | H | —$C_6H_3Cl_2$-2,4 | 139–141 |
| 69 | $CH_3O$ | $CH_3O$ | H | —C(O)NHCH$_3$ | 162–163 |
| 70 | $CH_3O$ | $CH_3O$ | H | —C(S)NHCH$_3$ | 114–116 |
| 71 | $C_2H_5O$ | $C_2H_5O$ | H | —C(O)NHCH$_3$ | 123.5–127 |
| 72 | $CH_3O$ | $CH_3O$ | H | —C(O)OC$_2$H$_5$ | 102–104 |
| 73 | $C_2H_5O$ | $C_2H_5S$ | H | $C_2H_5$ | Ca. 25 |

References at end of table.

TABLE I—Continued

| Example No. | $R^1$ | $R^2$ | $R^4$ | $R^5$ | Melting point, °C. |
|---|---|---|---|---|---|
| 74 | $CH_3O$ | $(CH_3)_2N$ | H | $C_2H_5$ | Oil |
| 75 | $CH_3O$ | $CH_3O$ | H | $-C(O)H$ | 104–106 |
| 76 | $CH_3O$ | $CH_3O$ | H | $-C(O)CH_3$ | 80–2 |
| 77 | $CH_3O$ | $CH_3O$ | H | $-C(O)CH_2Cl$ | 147–148 |
| 78 | $CH_3O$ | $CH_3O$ | H | $-C(O)C_2H_5$ | 136–138 |
| 79 | $CH_3O$ | $CH_3O$ | H | $-C(O)C_3H_7-n$ | 90–92 |
| 80 | $CH_3O$ | $CH_3O$ | H | $-C(O)C_6H_5$ | 110–112 |
| 81 | $CH_3O$ | $C_2H_5O$ | H | $-C(O)H$ | 83.5–85.5 |
| 82 | $C_2H_5O$ | $C_2H_5O$ | H | $-C(O)H$ | 82–84.5 |
| 83 | $n-C_3H_7O$ | $n-C_3H_7O$ | H | $-C(O)H$ | 83–85 |
| 84 | $ClCH_2CH_2O$ | $ClCH_2CH_2O$ | H | $-C(O)H$ | 63–65 |
| 85 | $CH_3O$ | $CH_3O$ | $CH_3$ | $-C(O)H$ | 107–109 |
| 86 | $CH_3O$ | $CH_3O$ | H | $-CH_2OH$ | Oil |
| 87 | $CH_3O$ | $CH_3O$ | H | $-CH_2COOCH_3$ | Oil |
| 88 | $CH_3O$ | $CH_3O$ | H | $-CH_2CH_2COOCH_3$ | 42–45 |
| 89 | $CH_3O$ | $C_2H_5O$ | H | $-C(O)CH_2Cl$ | 113–115 |
| 90 | $CH_3O$ | $C_2H_5O$ | H | $-C(O)CH_3$ | Oil |
| 91 | $CH_3O$ | $CH_3O$ | H | $-C(O)CH_2C_6H_5$ | 145–147 |
| 92 | $CH_3O$ | $CH_3O$ | H | $-C(O)CH=CH_2$ | 118–119 |
| 93 | $CH_3O$ | $CH_3O$ | H | $-C(O)CH_2CH_2Cl$ | 122–124 |
| 94 | $CH_3O$ | $CH_3O$ | H | $-C(O)CH_2OCH_3$ | 84–86 |
| 95 | $CH_3O$ | $CH_3O$ | H | $-C(O)CH_2OCH_2C_6H_5$ | 98–100 |
| 96 | $CH_3O$ | $CH_3O$ | H | $-C(O)CH_2OC_6H_5$ | 108–110 |
| 97 | $CH_3O$ | $CH_3O$ | H | $-C(O)COOCH_3$ | 102–103 |
| 98 | $CH_3O$ | $CH_3O$ | H | $-C(O)CH_2COOC_2H_5$ | 84–86 |
| 99 | $CH_3O$ | $CH_3O$ | H | $-C(O)CH_2CH_2COOCH_3$ | 120–122 |
| 100 | $CH_3O$ | $CH_3O$ | H | $-C(O)CH=CHCOOCH_3$ | 140–141 |
| 101 | $CH_3O$ | $CH_3O$ | H | $-C(O)CH_2SCH_3$ | 76–78 |
| 102 | $CH_3O$ | $CH_3O$ | H | $-C(O)CH_2SCH_2C_6H_5$ | 115–117 |
| 103 | $CH_3O$ | $C_2H_5O$ | H | $-C(O)CH_2SCH_2C_6H_5$ | 86–100 |
| 104 | $CH_3O$ | $CH_3O$ | $CH_3$ | $-C(O)CH_2SCH_2C_6H_5$ | 69–71 |
| 105 | $CH_3O$ | $CH_3O$ | H | $-C(O)CH_2SC_6H_5$ | 118–120 |
| 106 | $CH_3O$ | $CH_3O$ | H | $-C(O)CH_2SC(O)CH_3$ | 90–92 |
| 107 | $CH_3O$ | $CH_3O$ | H | $-C(O)CH_2SCN$ | 143–145 |
| 108 | $CH_3O$ | $CH_3O$ | H | $-C(O)CH_2CH_2SC_6H_5$ | 53–63 |

[1] Decomposition.

TABLE II.—MISCELLANEOUS COMPOUNDS (a) trans-(Phosphorylthio) acrylamides $$(R^1)_2\overset{O}{\underset{\|}{P}}-S-CH=\underset{\underset{R^4}{|}}{\overset{\overset{C(O)NHR^5}{|}}{C}}$$

| Example No. | $R^1$ | $R^4$ | $R^5$ | Melting point (°C.) |
|---|---|---|---|---|
| 109 | $C_2H_5O$ | H | $C_2H_5$ | Oil |
| 110 | $C_2H_5O$ | Br | $C_2H_5$ | Oil |

TABLE II—Continued (b) Compounds of the type $$(R^1)_2\overset{O}{\underset{\|}{P}}-S-CH=CH-C(O)NR^5R^6$$

| Example No. | $R^1$ | $R^5$ | $R^6$ | Melting point (°C.) |
|---|---|---|---|---|
| 111 | $CH_3O$ | $CH_3$ | $CH_3$ | 41–43 |
| 112 | $CH_3O$ | $CH_3$ | $OCH_3$ | Oil |
| 113 | $CH_3O$ | $R^5$ and $R^6$ together= $-CH_2CH_2CH_2CH_2-$ | | 65–66.5 |
| 114 | $CH_3O$ | $R^5$ and $R^6$ together= $-CH_2CH_2OCH_2CH_2-$ | | 63–67 |

TABLE III

| | | Elemental analyses found (calculated) for the various examples, percent of— | | | | |
|---|---|---|---|---|---|---|
| Example No. | Empirical formula | C | H | N | P | S, etc. |
| 1 | $C_5H_{10}NO_4PS$ | 28.6 (28.4) | 5.0 (4.8) | 6.4 (6.6) | 14.8 (14.7) | 15.0 (15.2) |
| 2 | $C_6H_{12}NO_4PS$ | 32.7 (32.0) | 5.7 (5.4) | 6.2 (6.2) | 13.0 (13.8) | 14.0 (14.2) |
| 3 | $C_5H_9BrNO_4PS$ | 21.6 (20.7) | 3.3 (3.1) | 4.8 (4.8) | 10.1 (10.7) | 10.4 (11.0), Br, 25.9 (27.4) |
| 4 | $C_6H_{12}NO_4PS$ | 32.1 | 5.5 | 6.3 | 13.5 | 14.5 |
| 5 | $C_7H_{14}NO_4PS$ | 35.2 | 5.9 | 5.8 | 13.1 | 13.4 |
| 6 | $C_9H_{18}NO_4PS$ | 40.9 | 6.9 | 5.2 | 11.9 | 12.2 |
| 7 | $C_9H_{14}NO_4PS$ | 41.3 (41.1) | 5.1 (5.4) | 5.5 (5.4) | 11.6 (11.8) | 12.2 (12.1) |
| 8 | $C_6H_{12}NO_4PS$ | 32.1 (32.0) | 5.2 (5.4) | 6.0 (6.2) | 13.5 (13.7) | 14.3 (14.2) |
| 9 | $C_7H_{14}NO_4PS$ | 34.9 (35.1) | 6.0 (5.9) | 5.7 (5.8) | 13.0 (12.9) | 13.1 (13.4) |
| 10 | $C_5H_{10}NO_4PS$ | 37.7 (37.9) | 6.3 (6.3) | 5.4 (5.5) | (12.2) | (12.7) |
| 11 | $C_8H_{16}NO_4PS$ | 38.0 | 6.0 | 5.2 | 12.0 | 12.7 |
| 12 | $C_9H_{18}NO_4PS$ | 40.2 | 6.7 | 5.2 | 11.6 | 11.9 |

References at end of table.

TABLE III—Continued

| Example No. | Empirical formula | C | H | N | P | S, etc. |
|---|---|---|---|---|---|---|
| 13 | C₁₀H₁₉N₂O₅PS | 38.6 (38.7) | 6.3 (6.2) | 8.8 (9.0) | 9.6 (10.0) | 10.5 (10.3) |
| 14 | C₁₂H₁₆ClN₂O₄PS | 41.3 (41.1) | 4.7 (4.6) | 7.8 (8.0) | 8.7 (8.8) | 9.1 (9.1) |
| 15 | C₁₂H₁₆N₃O₅PS | 40.5 (39.9) | 4.3 (4.5) | 11.8 (11.7) | 8.3 (8.6) | Cl, 10.1 (10.1), 8.8 (8.9) |
| 16 | C₇H₁₄NO₄PS | 35.2 | 5.9 | 5.6 | 12.7 | 13.3 |
| 17 | C₈H₁₆NO₄PS | 38.2 | 6.1 | 5.4 | 12.4 | 12.9 |
| 18 | C₈H₁₆NO₄PS | 38.0 | 6.4 | 5.4 | 11.9 | 12.9 |
| 19 | C₉H₁₈NO₄PS | 40.2 | 7.5 | 5.0 | 11.7 | 11.6 |
| 20 | C₉H₁₈NO₄PS | 40.5 (40.4) | 6.7 (6.8) | 5.1 (5.2) | 11.9 (11.6) | 12.0 (12.0) |
| 21 | C₁₀H₂₀NO₄PS | 41.6 (42.7) | 7.4 (7.2) | 4.3 (5.0) | 10.2 (11.0) | 10.1 (11.4) |
| 22 | C₉H₁₈NO₄PS | 40.1 | 6.9 | 5.2 | 11.2 | 12.1 |
| 23 | C₁₀H₂₀NO₄PS | 39.8 | 6.7 | 4.5 | 9.9 | 10.7 |
| 24 | C₉H₁₇BrNO₄PS | 31.8 (31.2) | 4.5 (4.9) | 3.9 (4.1) | 8.5 (8.9) | 8.9 (9.3), Br, 22.9 (23.1) |
| 25 | C₇H₁₃ClNO₄PS | 30.6 (30.7) | 4.6 (4.8) | 5.0 (5.1) | 11.2 (11.3) | 11.7 (11.7), Cl, 13.0 (13.0) |
| 26 | C₉H₁₇ClNO₄PS | 35.6 (35.8) | 5.9 (5.7) | 4.5 (4.6) | 9.9 (10.3) | 11.1 (10.6), Cl, 11.5 (11.6) |
| 27 | C₈H₁₆NO₅PS | 35.6 (35.7) | 6.6 (6.0) | 4.9 (5.2) | 11.8 (11.5) | 11.7 (11.9) |
| 28 | C₈H₁₆NO₄PS₂ | 35.9 (36.1) | 6.2 (6.1) | 4.6 (4.7) | 10.2 (10.3) | 21.7 (21.4) |
| 29 | C₈H₁₃N₂O₄PS | 36.2 (36.4) | 4.9 (5.0) | 10.4 (10.6) | 11.4 (11.7) | 12.1 (12.1) |
| 30 | C₁₃H₁₈NO₄PS | 49.6 (49.5) | 5.9 (5.8) | 4.2 (4.4) | 9.7 (9.8) | 10.4 (10.2) |
| 31 | C₈H₁₆NO₄PS | 37.8 | 6.1 | 5.4 | 12.0 | 12.7 |
| 32 | C₁₀H₂₀NO₄PS | 42.7 | 7.1 | 4.9 | 10.7 | 11.4 |
| 33 | C₈H₁₆NO₄PS | 38.2 | 6.4 | 5.5 | 12.5 | 12.8 |
| 34 | C₁₀H₂₀NO₄PS | 42.3 (42.7) | 7.0 (7.2) | 4.8 (5.0) | 11.3 (11.0) | 11.4 (11.4) |
| 35 | C₉H₁₈NO₄PS | 40.6 (40.4) | 7.0 (6.8) | 5.1 (5.2) | 11.6 (11.6) | 12.1 (12.0) |
| 36 | C₈H₁₄NO₄PS | 38.5 (38.2) | 5.7 (5.6) | 5.6 (5.6) | 12.4 (12.3) | 12.9 (12.8) |
| 37 | C₉H₁₆NO₄PS | 40.7 (40.8) | 6.0 (6.1) | 5.2 (5.3) | 11.9 (11.7) | 12.2 (12.1) |
| 38 | C₁₀H₁₈NO₄PS | 43.4 (43.0) | 6.7 (6.4) | 5.1 (5.0) | 11.0 (11.1) | 11.5 (11.5) |
| 39 | C₉H₁₈NO₄PS | 40.2 (40.4) | 6.7 (6.8) | 5.1 (5.2) | 11.6 (11.6) | 12.1 (12.0) |
| 40 | C₉H₁₈NO₄PS | 40.1 | 6.9 | 5.1 | 11.9 | 12.1 |
| 41 | C₁₀H₂₀NO₄PS | 42.9 | 7.5 | 5.1 | 10.7 | 11.2 |
| 42 | C₉H₁₈NO₄PS | 40.6 | 6.7 | 5.2 | 11.8 | 12.0 |
| 43 | C₁₀H₂₀NO₄PS | 43.1 | 7.3 | 5.0 | 10.9 | 11.2 |
| 44 | C₁₀H₂₀NO₄PS | 42.7 | 7.1 | 4.9 | 10.9 | 11.7 |
| 45 | C₁₀H₂₀NO₄PS | 42.6 | 7.1 | 4.9 | 11.0 | 11.5 |
| 46 | C₁₁H₂₂NO₄PS | 45.0 | 7.8 | 4.8 | 10.3 | 10.8 |
| 47 | C₁₀H₂₀NO₄PS | 42.5 | 7.5 | 5.0 | 10.3 | 11.1 |
| 48 | C₁₁H₂₂NO₄PS | 41.7 | 7.6 | 4.3 | 10.7 | 9.9 |
| 49 | C₁₀H₁₈NO₄PS | 42.8 (43.0) | 6.6 (6.5) | 4.8 (5.0) | 10.8 (11.1) | 11.6 (11.5) |
| 50 | C₁₁H₂₂NO₄PS | 43.9 (44.7) | 7.5 (7.5) | 4.4 (4.8) | 11.3 (10.5) | 10.6 (10.8) |
| 51 | C₁₁H₂₀NO₄PS | 45.2 (45.0) | 6.9 (6.9) | 4.7 (4.8) | 10.7 (10.6) | 10.9 (10.8) |
| 52 | C₁₃H₂₆NO₄PS | 48.3 (48.3) | 7.9 (8.1) | 4.4 (4.3) | 9.9 (9.6) | 9.9 (9.9) |
| 53 | C₁₅H₃₀NO₄PS | 51.0 (51.3) | 8.4 (8.6) | 3.9 (4.0) | 8.6 (8.8) | 8.9 (9.1) |
| 54 | C₈H₁₄NO₄PS | 37.8 | 5.9 | 5.2 | 12.5 | 12.7 |
| 55 | C₁₂H₁₆NO₄PS | 47.8 (47.8) | 5.2 (5.3) | 4.6 (4.6) | 9.5 (10.3) | 11.1 (10.9) |
| 56 | C₁₂H₁₅ClNO₄PS | 43.1 (42.9) | 4.7 (4.5) | 4.1 (4.2) | 9.3 (9.2) | 9.2 (9.6), Cl, 10.9 (10.6) |
| 57 | C₁₄H₁₉ClNO₄PS | 46.4 (46.2) | 5.5 (5.3) | 3.9 (3.9) | 7.9 (8.5) | 8.9 (8.8), Cl, 9.8 (9.7) |
| 58 | C₁₁H₁₄NO₄PS | 46.2 (46.0) | 5.0 (4.9) | 4.8 (4.9) | 10.5 (10.8) | 11.0 (11.2) |
| 59 | C₁₂H₁₆NO₄PS | 47.9 (47.8) | 5.4 (5.4) | 4.6 (4.7) | 1.1 (1.3) | 1.8 (1.6) |
| 60 | C₁₁H₁₃ClNO₄PS | 41.4 (41.1) | 4.3 (4.1) | 4.5 (4.4) | 9.2 (9.6) | 9.7 (10.0), Cl, 11.4 (11.0) |
| 61 | C₁₁H₁₃ClNO₄PS | 41.3 | 4.2 | 4.2 | 9.3 | 9.9 (10.0), Cl, 11.2 |
| 62 | C₁₁H₁₃ClNO₄PS | 41.6 | 4.5 | 4.8 | 9.2 | 9.9 (10.0), Cl, 11.2 |
| 63 | C₁₂H₁₆NO₄PS | 46.5 | 5.2 | 4.4 | 9.8 | 10.7 |
| 64 | C₁₂H₁₆NO₄PS | 47.9 | 5.4 | 4.5 | 9.9 | 10.6 |
| 65 | C₁₃H₁₈NO₄PS | 50.6 | 5.7 | 4.5 | 8.6 | 10.7 |
| 66 | C₁₁H₁₃N₂O₆PS | 40.1 (39.8) | 4.0 (3.9) | 8.4 (8.4) | 8.5 (9.3) | 9.8 (9.6) |
| 67 | C₁₂H₁₆NO₆PS₂ | 39.6 (39.4) | 4.5 (4.4) | 3.7 (3.8) | 8.0 (8.5) | 18.0 (17.6) |
| 68 | C₁₁H₁₂Cl₂NO₄PS | 37.2 (37.1) | 3.5 (3.4) | 3.9 (3.9) | 8.0 (8.7) | 9.1 (9.0) |
| 69 | C₇H₁₃N₃O₅PS | 31.6 (31.3) | 5.0 (4.9) | 10.3 (10.4) | 11.2 (11.5) | 12.2 (12.0) |
| 70 | C₇H₁₃N₂O₄PS₂ | 29.7 (29.6) | 4.5 (4.6) | 9.8 (9.8) | 10.8 (10.9) | 22.6 (22.9) |
| 71 | C₉H₁₇N₂O₅PS | 36.7 (36.5) | 5.9 (5.8) | 9.7 (9.5) | 10.0 (10.5) | 11.2 (10.8) |
| 72 | C₈H₁₄NO₆PS | 34.2 (33.9) | 5.0 (5.0) | 4.9 (5.0) | 10.7 (10.9) | 11.3 (11.3) |
| 73 | C₉H₁₈NO₃PS₂ | 38.1 (38.1) | 6.4 (6.4) | 4.9 (5.0) | 10.9 (10.9) | 21.1 (22.6) |
| 74 | C₈H₁₇N₂O₃PS | 41.1 (38.1) | 7.4 (6.8) | 11.5 (11.1) | 11.6 (12.3) | 13.5 (12.7) |
| 75 | C₆H₁₀NO₅PS | 30.4 (30.1) | 4.2 (4.2) | 5.7 (5.9) | 12.1 (13.0) | 13.7 (13.4) |
| 76 | C₇H₁₂NO₅PS | 33.4 (33.2) | 4.8 (4.8) | 5.4 (5.5) | 12.1 (12.2) | 12.8 (12.7) |
| 77 | C₇H₁₁ClNO₅PS | 29.6 (29.2) | 4.1 (3.8) | 4.7 (4.9) | 10.6 (10.8) | 11.2 (11.2), Cl, 12.7 (12.3) |
| 78 | C₈H₁₄NO₅PS | 36.4 (36.0) | 5.3 (5.3) | 5.3 (5.2) | 11.6 (11.6) | 12.0 (12.0) |
| 79 | C₉H₁₆NO₅PS | 38.1 (38.4) | 5.7 (5.7) | 4.9 (5.0) | 11.0 (11.0) | 11.6 (11.4) |
| 80 | C₁₂H₁₄NO₅PS | 45.3 (45.7) | 4.5 (4.5) | 4.4 (4.4) | 9.7 (9.8) | 10.6 (10.2) |
| 81 | C₇H₁₂NO₅PS | 33.2 | 4.9 | 5.4 | 12.1 | 12.7 |
| 82 | C₈H₁₄NO₅PS | 35.9 | 5.6 | 5.3 | 11.2 | 12.0 |
| 83 | C₁₀H₁₈NO₅PS | 40.6 (40.7) | 6.1 (6.1) | 4.7 (4.7) | 10.5 (10.5) | 11.1 (10.9) |
| 84 | C₈H₁₂Cl₂NOPS | 28.8 (28.6) | 3.4 (3.6) | 4.2 (4.2) | 9.2 (9.2) | 9.5 (9.5), Cl, 20.9 (21.1) |
| 85 | C₇H₁₂NO₅PS | 33.2 | 5.0 | 5.5 | 11.7 | 12.7 |
| 86 | C₆H₁₂NO₅PS | 30.0 (29.9) | 5.3 (5.0) | 5.8 (5.8) | 12.6 (12.8) | 13.4 (13.3) |
| 87 | C₈H₁₄NO₄PS | 32.4 (33.9) | 4.3 (5.0) | 4.1 (4.4) | 10.7 (10.9) | 11.0 (11.3) |
| 88 | C₉H₁₆NO₆PS | 36.2 (36.4) | 5.4 (5.4) | 4.8 (4.7) | 10.1 (10.4) | 10.5 (10.8) |
| 89 | C₈H₁₃ClNO₅PS | 31.3 (31.8) | 4.3 (4.3) | 4.7 (4.6) | 10.4 (10.3) | 10.7 (10.6), Cl, 11.9 (11.8) |
| 90 | C₈H₁₄NO₅PS | 34.6 | 5.1 | 5.0 | 11.5 | 11.9 |
| 91 | C₁₃H₁₆NO₅PS | 47.8 (47.4) | 4.9 (4.9) | 4.1 (4.3) | 8.7 (9.4) | 9.8 (9.7) |
| 92 | C₈H₁₂NO₅PS | 36.7 (36.2) | 4.6 (4.6) | 5.2 (5.3) | 11.0 (11.7) | 11.8 (12.1) |
| 93 | C₈H₁₃ClNO₅PS | 31.8 (31.9) | 4.4 (4.3) | 4.5 (4.6) | 9.8 (10.3) | 10.8 (10.6) |
| 94 | C₈H₁₄NO₆PS | 34.6 | 4.9 | 5.0 | 10.9 | 11.6 |
| 95 | C₁₄H₁₈NO₆PS | 47.6 (46.8) | 5.4 (5.1) | 3.8 (3.9) | 8.2 (8.7) | 9.3 (8.9) |
| 96 | C₁₃H₁₆NO₆PS | 45.2 (45.2) | 4.7 (4.7) | 4.1 (4.1) | 9.0 (9.0) | 9.2 (9.3) |
| 97 | C₈H₁₂NO₇PS | 32.6 (32.3) | 4.0 (4.1) | 4.6 (4.7) | 10.3 (10.4) | 10.9 (10.8) |
| 98 | C₁₀H₁₆NO₇PS | 37.2 (36.9) | 5.3 (5.0) | 4.3 (4.3) | 9.1 (9.5) | 10.1 (9.9) |
| 99 | C₁₀H₁₆NO₆PS | 37.4 (38.8) | 5.0 (5.2) | 4.1 (4.5) | 9.3 (10.0) | 10.2 (10.4) |
| 100 | C₁₀H₁₄NO₇PS | 37.5 (37.2) | 4.1 (4.3) | 4.2 (4.3) | 9.4 (9.6) | 10.1 (9.9) |
| 101 | C₈H₁₄NO₅PS₂ | 32.6 (32.1) | 4.6 (4.7) | 4.6 (4.7) | 9.7 (10.3) | 22.0 (21.4) |
| 102 | C₁₄H₁₈NO₅PS₂ | 45.3 (44.8) | 5.2 (4.8) | 3.7 (3.7) | 7.9 (8.2) | 17.3 (17.1) |
| 103 | C₁₅H₂₀NO₅PS₂ | 46.2 (46.3) | 5.0 (5.2) | 3.6 (3.6) | 7.6 (8.0) | 16.7 (16.5) |
| 104 | C₁₅H₂₀NO₅PS₂ | 46.4 | 5.3 | 3.6 | 7.7 | 16.4 |
| 105 | C₁₃H₁₆NO₅PS₂ | 43.2 (43.2) | 4.7 (4.5) | 3.8 (3.9) | 8.5 (8.6) | 17.9 (17.7) |
| 106 | C₉H₁₁NO₆PS₂ | 33.5 (33.0) | 4.5 (4.3) | 4.3 (4.3) | 8.6 (9.5) | 20.0 (19.6) |
| 107 | C₈H₁₁N₂O₅PS₂ | 31.1 (31.0) | 3.9 (3.6) | 8.4 (9.0) | 9.5 (10.0) | 20.1 (20.7) |
| 108 | C₁₄H₁₈NO₅PS₂ | 44.2 (44.8) | 4.9 (4.8) | 3.6 (3.7) | 8.8 (8.3) | 16.7 (17.1) |
| 109 | C₉H₁₇NO₄PS | 40.2 (40.4) | 7.3 (6.8) | 5.1 (5.2) | --- | --- |
| 110 | C₉H₁₇BrNO₄PS | 33.1 (31.2) | 5.7 (4.9) | 4.2 (4.1) | 9.3 (8.9) | 8.7 (9.3), Br, 21.3 (23.1) |
| 111 | C₇H₁₄NO₄PS | 35.4 | 6.1 | 5.8 | 12.6 | 13.6 |
| 112 | C₇H₁₄NO₅PS | 32.7 (32.9) | 5.6 (5.5) | 5.5 (5.5) | 12.4 (12.1) | 12.8 (12.6) |
| 113 | C₉H₁₆NO₄PS | 40.8 | 6.2 | 5.3 | 11.6 | 12.3 |
| 114 | C₉H₁₆NO₅PS | 38.6 (38.4) | 5.6 (5.7) | 5.0 (5.0) | 11.0 (11.0) | 11.6 (11.4) |

NOTE: The number in parenthesis represents the theoretical value, as calculated using the empirical formula. Only one set of theoretical values is given for each empirical formula.

TABLE IV.—ISOTHIAZOLONE INTERMEDIATES

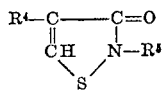

| Used in Example— | R⁴ | R⁵ | Melting point or Boiling point (° C.) |
|---|---|---|---|
| 1, etc. | H | H | 75–76. |
| 2 | CH₃ | H | 118.5–122.5. |
| 3 | Br | H | 193–195. |
| 8, etc. | H | CH₃ | 48–50. |
| 10, etc. | CH₃ | CH₃ | 71–78. |
| 13 | H | —CH₂N⟨O⟩ | 114–115. |
| 14 | H | —CH₂NHC₆H₄Cl-4 | 93–94. |
| 15 | H | —CH₂NHC₆H₄NO₂-4 | 196–197. |
| 17, etc. | CH₃ | C₂H₅ | 80–90/0.1–0.6 mm.* |
| 22 | C₂H₅ | C₂H₅ | 67–69/0.1 mm.* |
| 23 | n-C₄H₉ | C₂H₅ | 93–95/0.2 mm.* |
| 24 | Br | C₂H₅ | ca. 30. |
| 26 | H | —CH₂CH₂Cl | 100/0.02 mm.* |
| 27 | H | —CH₂CH₂OCH₃ | 89–112/0.05 mm.* |
| 29 | H | —CH₂CH₂CN | 85–86. |
| 30 | H | —CH₂CH₂C₆H₅ | 77.5–78.5. |
| 31, etc. | H | —C₃H₇-n | 65–68. |
| 33, etc. | H | —C₃H₇-iso | 84/0.15 mm.* |
| 36, etc. | H | Cyclopropyl | 65–68. |
| 39 | H | —C₄H₉-n | 99. |
| 40 | H | —C₄H₉-sec | 84–85. |
| 41 | CH₃ | —C₄H₉-sec | 94–96/0.1 mm.* |
| 42 | H | —C₄H₉-tert | 75–79. |
| 43 | CH₃ | —C₄H₉-tert | Oil. |
| 44 | H | —C₅H₁₁-n | 118/0.01 mm.* |
| 18, etc. | H | C₆H₅ | 72/0.25 mm.* |
| 45 | H | —CH(C₂H₅)₂ | 86–87/0.1 mm.* |
| 46 | CH₃ | —CH(C₂H₅)₂ | 80–81/0.05 mm.* |
| 47 | H | —CH(CH₃)C₃H₇-n | 90–91/0.15 mm.* |
| 48 | CH₃ | —CH(CH₃)C₃H₇-n | 81–82/0.05 mm.* |
| 49 | H | Cyclopentyl | 116–117. |
| 50 | H | —C₆H₁₃-n | 102/0.025 mm.* |
| 51 | H | Cyclohexyl | 109–111. |
| 52, etc. | H | —C₆H₁₇-tert | 97–100. |
| 54 | H | —CH₂CH=CH₂ | 95/0.5 mm.* |
| 55 | H | —CH₂C₆H₅ | 78–80. |
| 56 | H | —CH₂C₆H₄Cl-4 | 87–88. |
| 58 | H | —C₆H₅ | 91–92. |
| 59 | CH₃ | —C₆H₅ | 102–104. |
| 60 | H | —C₆H₄Cl-2 | 90–91. |
| 61 | H | —C₆H₄Cl-3 | 119–122. |
| 62 | H | —C₆H₄Cl-4 | 142–144. |
| 63 | H | —C₆H₄CH₃-2 | 76–78. |
| 64 | H | —C₆H₄CH₃-4 | 91–93. |
| 65 | CH₃ | —C₆H₄CH₃-4 | 127–129. |
| 66 | H | —C₆H₄NO₂-4 | 170–175. |
| 67 | H | —C₆H₄SO₂CH₃-4 | 189–190. |
| 68 | H | —C₆H₃Cl₂-2,4 | 159–161. |
| 69, etc. | H | —C(O)NHCH₃ | 138–140. |
| 70 | H | —C(S)NHCH₃ | 155–158. |
| 72 | H | —C(O)OC₂H₅ | 124–126. |
| 75, etc. | H | —C(O)H | 126–127. |
| 76, etc. | H | —C(O)CH₃ | 95.5–97.5. |
| 77, etc. | H | —C(O)CH₂Cl | 107–109. |
| 78 | H | —C(O)C₂H₅ | 132–134. |
| 79 | H | —C(O)C₃H₇-n | 56–59. |
| 80 | H | —C(O)C₆H₅ | 108–110. |
| 85 | CH₃ | —C(O)H | 150–152. |
| 86 | H | —CH₂OH | 125–127. |
| 87 | H | —CH₂COOCH₃ | Oil. |
| 88 | H | —CH₂CH₂COOCH₃ | 115/.05 mm.* |
| 91 | H | C(O)CH₂C₆H₅ | 111–113. |
| 92 | H | C(O)CH=CH₂ | 128–132. |
| 93 | H | C(O)CH₂CH₂Cl | 99–101. |
| 94 | H | C(O)CH₂OCH₃ | 102–104. |
| 95 | H | C(O)CH₂OCH₂C₆H₅ | 115–117. |
| 96 | H | C(O)CH₂OC₆H₅ | 74–75. |
| 97 | H | C(O)COOCH₃ | 68–72. |
| 98 | H | C(O)CH₂COOC₂H₅ | Oil. |
| 99 | H | C(O)CH₂CH₂COOCH₃ | 96.5–98.5. |
| 100 | H | C(O)CH=CHCOOCH₃ | 140–142. |
| 101 | H | C(O)CH₂SCH₃ | 89–91. |
| 102, etc. | H | C(O)CH₂SCH₂C₆H₅ | 67–68. |
| 104 | CH₃ | C(O)CH₂SCH₂C₆H₅ | 82–84. |
| 105 | H | C(O)CH₂SC₆H₅ | Oil. |
| 106 | H | C(O)CH₂SC(O)CH₃ | 112–114. |
| 108 | H | —C(O)CH₂CH₂SC₆H₅ | 78–81. |

*Boiling point.

The novel 3-phosphorylthio acrylamides of this invention are biologically active. In particular they are effective as insecticides, miticides, nematocides and ovicides and as such exhibit a broad spectrum of activity. The cis-form (Formula II) is in general more active than its trans-isomer (Formula III).

Initial evaluations were made on the following mite, insects and nematode:

| Code symbol | Common name | Latin name |
|---|---|---|
| TSM | Two-spotted spider mite | (*Tetranychus urticae*). |
| GPA | Green peach aphid | (*Myzus persicae*). |
| PA | Pea aphid | (*Acyrthosiphon pisum*). |
| BB | Mexican bean beetle | (*Epilachna varivestis*). |
| AW | Southern armyworm | (*Prodenia eridania*). |
| BW | Boll weevil | (*Anthonomus grandis*). |
| HF | House fly | (*Musca domestica*). |
| GR | German cockroach | (*Blatella germanica*). |
| FB | Confused flour beetle | (*Tribolium confusum*). |
| GW | Granary weevil | (*Sitophilus granarius*). |
| BCB | Black carpet beetle | (*Attagenus piceus*). |
| Nema | Northern root-knot nematode | (*Meloidogyne hapla*). |

A test solution containing 600 p.p.m. was made by dissolving the test compound in a solvent (acetone:methanol, 1:1), adding surfactant and then water to give an acetone:methanol: H₂O system of 10:10:80. A 1:1 mixture of an alkylarylpolyether-alcohol (sold under the trademark Triton X–155) and a modified phthalic glycerol alkyd resin (sold under the trademarked name of Triton B–1956) was utilized at the equivalent of 1 ounce per 100 gal. of test solution as a surfactant. For the nematode test a 1200 p.p.m. test solution was used.

For the mite test, infested bean (*Phaseolus limeanus*) leaf discs (1.25 inches in diameter) containing about 50 mites and for green peach aphid tests, infested broccoli (*Brassica oleracea italica*) leaves or portions thereof containing about 50 aphids were placed in a Petri dish lid on a moistened piece of cotton. The leaves were then sprayed with the test solution using a rotating turntable. They were held for 24 hours and then the percent kill was determined.

For the pea aphid test, broad bean (*Vicia faba*) plants pruned to 2 leaves were sprayed manually to run off and allowed to dry. These were placed horizontally in plastic boxes (5 x 7.5 x 3.5 inches) and infested with 50–100 aphids of mixed ages. The boxes were covered with lids containing screened ventilation holes. After 48 hours the percent kill was determined.

For the bean beetle and armyworm test, detached bean leaves on a piece of moistened filter paper were sprayed as above for the mite test in similar containers and allowed to dry. One leaf was transferred to an unsprayed dish also containing moistened filter paper and infested with 10 third instar Mexican bean beetle larvae. The leaf remaining in the sprayed dish was infested with 10 third instar southern armyworm larvae. The dishes were covered. After holding for 48 hours the percent kill was obtained.

For the boll weevil, house fly and cockroach tests, half pint glass canning jars with a screened top were used. Food was supplied for the boll weevil (apple) and for the house fly (sugar water). The test insects consisted of 10 adult boll weevils, 20 adult house flies and 10 last instar nymphs for the cockroach. The jars containing the insects were sprayed using the turntable. The percent kill of boll weevil was determined 48 hours after application. In the house fly test a percent knockdown was determined 1 hour after application, the percent kill after 24 hours. Roach kill was determined after 24 hours.

For the flour beetle and granary weevil tests, one-third pint squat glass dishes were sprayed and allowed to dry. There were then introduced about 20 adults of each species into each dish which was then covered. Percent kills were observed after 48 hours.

For the carpet beetle test a 2″ square swatch of wool felt (AATCC moth test cloth) conditioned with 1 ml. of acetone was impregnated via pipette with 1 ml. of the test solution and allowed to dry. The cloth was placed in a Petri dish, infested with 10 6–7 month larvae and covered. This was held for about 3 weeks and the percent feeding determined in comparison with untreated fabric held under similar circumstances.

For the nematode test, soil was homogeneously inoculated with a macerated blend of tomato roots heavily knotted with the root-knot nematode. Ten ml. of the test solution was added to 200 ml. of the inoculated soil in a 16 oz. jar to give a concentration by volume of about 60 p.p.m. The jar was then shaken to insure thorough mixing and kept capped for 72 hours. The soil was then placed into a 3″ plastic plant pot and allowed to air for about 24 hours after which time 3 cucumber (*Cucumis sativus*) seeds were planted. About twenty-three days thereafter, the cucumber plants were removed from the soil and the root systems examined for the presence of knots. A total of 30 knots is considered as no control (−) and less than that as a measure of control (+).

Table V gives the results of the above biological evaluations.

TABLE V.—INSECTICIDAL AND MITICIDAL DATA—PERCENT CONTROL, ETC., AT 600 P.P.M.

| Example | TSM | GPA* | PA | BB | AW | BW | HF Percent KD | HF Percent kill | GR | FB | GW | BCB, percent feeding | Nema, +, − control |
|---|---|---|---|---|---|---|---|---|---|---|---|---|---|
| 1 | 100 | 98 | 100 | 100 | 100 | 100 | 95 | 100 | 100 | 100 | 100 | 1 | − |
| 2 | 100 | 100 | c 100 | 100 | 100 | 100 | 100 | 100 | 80 | 100 | 100 | 0 | − |
| 3 | 100 | 99 | 96 | 0 | 0 | 90 | 0 | 95 | 20 | 0 | 61 | 100 | − |
| 4 | 100 | 100 | a 100 | 100 | 100 | 100 | 100 | 100 | 100 | 100 | 100 | 0 | − |
| 5 | 100 | 100 | b 100 | 100 | 20 | 100 | 100 | 100 | 100 | 100 | 100 | <20 | − |
| 6 | 78 | 34 | a 100 | 10 | 0 | 20 | 5 | 80 | 0 | 0 | 0 | <50 | − |
| 7 | 100 | 33 | NT | 70 | 0 | 30 | 0 | 5 | 0 | 0 | 79 | 1 | − |
| 8 | 100 | 100 | 100 | 100 | 100 | 100 | 100 | 100 | 40 | 100 | 100 | 0 | − |
| 9 | 100 | 100 | b 100 | 100 | 100 | 80 | 100 | 100 | 100 | 100 | 100 | 0 | − |
| 10 | 100 | 100 | a 100 | 100 | 100 | 100 | 100 | 100 | 100 | 100 | 100 | 1 | + |
| 11 | 100 | 100 | b 100 | 100 | 70 | 100 | 100 | 100 | 90 | 100 | 100 | 0 | + |
| 12 | 100 | 100 | b 100 | 90 | 0 | 100 | 50 | 100 | 60 | 100 | 100 | 0 | + |
| 13 | 100 | 96 | 100 | 100 | 60 | NT | 45 | 100 | NT | NT | NT | NT | − |
| 14 | 100 | 67 | 100 | 50 | 30 | NT | 95 | 100 | NT | NT | NT | NT | − |
| 15 | 91 | 0/5 | 0 | 90 | 0 | NT | 0 | 100 | NT | NT | NT | NT | − |
| 16 | 100 | 100 | 100 | 100 | 100 | 100 | 100 | 100 | 100 | 100 | 100 | 0 | − |
| 17 | 100 | 100 | b 100 | 100 | 100 | 100 | 100 | 100 | 60 | 100 | 100 | 0 | − |
| 18 | 100 | 100 | b 100 | 80 | 100 | 100 | 100 | 100 | 100 | 100 | 100 | 0 | − |
| 19 | 100 | 100 | a 100 | 100 | 100 | 100 | 100 | 100 | 100 | 100 | 100 | 0 | − |
| 20 | 100 | 100 | 100 | 100 | 100 | 100 | 100 | 100 | 100 | 100 | 100 | 0 | + |
| 21 | 100 | 100 | b 100 | 100 | 0 | 100 | 85 | 100 | 30 | 100 | 100 | <1 | + |
| 22 | 100 | 100 | 100 | 100 | 100 | NT | 100 | 100 | NT | NT | NT | NT | + |
| 23 | 100 | 100 | 100 | 100 | 50 | NT | 100 | 100 | NT | NT | NT | NT | + |
| 24 | 100 | 100 | 100 | 50 | 10 | 90 | 10 | 55 | 10 | 100 | 100 | 1 | − |
| 25 | 100 | 100 | b 100 | 90 | 100 | 100 | 100 | 100 | 40 | 100 | 100 | 0 | − |
| 26 | 100 | 100 | b 100 | 60 | 30 | 100 | 100 | 100 | 90 | 100 | 100 | 0 | − |
| 27 | 100 | 100 | 100 | 100 | 100 | 100 | 100 | 100 | 90 | 100 | 100 | 0 | − |
| 28 | 100 | 100 | c 100 | 100 | 20 | 100 | 95 | 100 | 0 | 100 | 100 | 0 | − |
| 29 | 100 | 95 | b 100 | 50 | 100 | 100 | 100 | 100 | 50 | 76 | 100 | 1 | − |
| 30 | 100 | 79 | 100 | 80 | 100 | NT | 80 | 100 | NT | NT | NT | NT | − |
| 31 | 100 | 100 | b 100 | 100 | 100 | 100 | 100 | 100 | 80 | 100 | 100 | 0 | − |
| 32 | 100 | 100 | 100 | 100 | 100 | 100 | 100 | 100 | 100 | 100 | 100 | 0 | + |
| 33 | 100 | 100 | b 100 | 100 | 100 | 100 | 100 | 100 | 70 | 100 | 100 | 0 | − |
| 34 | 100 | 100 | b 100 | 100 | 90 | 100 | 100 | 100 | 100 | 100 | 100 | 0 | + |
| 35 | 100 | 100 | a 100 | 100 | 100 | 100 | 95 | 100 | 60 | 100 | 100 | 0 | − |
| 36 | 100 | 97 | b 100 | 100 | 100 | 100 | 100 | 100 | 100 | 100 | 100 | 0 | − |
| 37 | 100 | 100 | a 100 | 90 | 100 | 100 | 100 | 100 | 100 | 100 | 100 | 0 | − |
| 38 | 100 | 100 | b 100 | 90 | 0 | 90 | 95 | 100 | 100 | 100 | 100 | 0 | + |
| 39 | 100 | 100 | 100 | 100 | 100 | 100 | 100 | 100 | 0 | 100 | 100 | 1 | − |
| 40 | 100 | 100 | b 100 | 70 | 100 | 100 | 90 | 100 | 80 | 100 | 100 | 0 | − |
| 41 | 100 | 100 | c 100 | 100 | 50 | 100 | 10 | 100 | 10 | 70 | 100 | 0 | − |
| 42 | 100 | 100 | b 100 | 70 | 25 | 80 | 100 | 100 | 10 | 100 | 100 | <1 | − |
| 43 | 100 | 100 | d 100 | 100 | 0 | 80 | 10 | 100 | 0 | 50 | 100 | 1 | − |
| 44 | 100 | 100 | 100 | 100 | 100 | 90 | 100 | 100 | 10 | 100 | 100 | 0 | − |
| 45 | 100 | 100 | 100 | 100 | 100 | NT | 100 | 100 | NT | NT | NT | NT | + |
| 46 | 100 | 100 | 100 | 100 | 90 | NT | 25 | 100 | NT | NT | NT | NT | − |
| 47 | 100 | 100 | 100 | 100 | 100 | NT | 100 | 100 | NT | NT | NT | NT | + |
| 48 | 100 | 100 | 100 | 100 | 10 | NT | 30 | 95 | NT | NT | NT | NT | − |
| 49 | 100 | 96 | NT | 100 | 50 | NT | 100 | 100 | 0 | 100 | 100 | NT | − |
| 50 | 100 | 100 | 100 | 100 | 100 | 80 | 100 | 100 | 40 | 100 | 100 | 0 | − |
| 51 | 100 | 100 | 90 | 100 | 100 | 90 | 100 | 100 | 40 | 100 | 100 | 0 | − |
| 52 | 63 | 0 | NT | 100 | 0 | 0 | 85 | 100 | 0 | 0 | 0 | 100 | − |
| 53 | 98 | 0 | NT | 80 | 0 | 10 | 60 | 75 | 0 | 0 | 0 | 100 | − |
| 54 | 100 | 100 | 100 | 100 | 100 | 100 | 100 | 100 | 90 | 100 | 100 | 0 | − |
| 55 | 100 | 80 | 100 | 100 | 100 | 90 | 100 | 100 | 0 | 0 | 0 | 1 | − |
| 56 | 100 | 100 | 80 | 80 | 90 | 100 | 90 | 100 | 20 | 19 | 100 | 0 | − |
| 57 | 100 | 67 | 20 | 80 | 20 | 70 | 30 | 100 | 10 | 100 | 100 | 0 | − |
| 58 | 100 | 100 | 30 | 100 | 100 | 90 | 75 | 100 | 0 | 0 | 0 | 1 | − |
| 59 | 100 | 100 | 100 | 90 | 30 | NT | 35 | 100 | NT | NT | NT | NT | − |
| 60 | 90 | 0 | NT | 80 | 100 | NT | 0 | 5 | NT | NT | NT | NT | − |
| 61 | 100 | 0 | NT | 100 | 10 | NT | 20 | 95 | NT | NT | NT | NT | − |
| 62 | 0 | 0 | NT | 90 | 100 | NT | 30 | 100 | NT | NT | NT | NR | − |
| 63 | 100 | 88 | 93 | 100 | 90 | NT | 95 | 100 | NT | NT | NT | NT | − |
| 64 | 100 | 90 | 0 | 90 | 80 | NT | 85 | 100 | NT | NT | NT | NT | − |
| 65 | 100 | 89 | 100 | 60 | 30 | NT | 75 | 100 | NT | NT | NT | NT | − |
| 66 | 0 | 0 | NT | 70 | 0 | NT | 0 | 0 | NT | NT | NT | NT | − |
| 67 | 100 | 0 | NT | 50 | 0 | NT | 0 | 0 | NT | NT | NT | NT | − |
| 68 | 100 | 0 | NT | 100 | 100 | 90 | 0 | 15 | 0 | 0 | 0 | 5 | − |
| 69 | 100 | 0 | NT | 50 | 0 | 90 | 0 | 5 | 0 | 0 | 0 | 25 | − |
| 70 | 98 | 14 | 100 | 60 | 22 | 30 | 0 | 50 | 0 | 0 | 90 | 100 | − |
| 71 | 100 | 0 | NT | 20 | 0 | 70 | 0 | 0 | 0 | 0 | 0 | 0 | − |
| 72 | 100 | 0 | NT | 50 | 0 | NT | 55 | 100 | NT | NT | NT | NT | − |
| 73 | 100 | 75 | 100 | 100 | 30 | 100 | 80 | 100 | 0 | 100 | 100 | 0 | − |
| 74 | 100 | 74 | 100 | 90 | 100 | 100 | 75 | 100 | 20 | 100 | 100 | 1 | + |
| 75 | 100 | 100 | 100 | 80 | 100 | NT | 100 | 100 | NT | NT | NT | NT | + |
| 76 | 100 | 90 | 100 | 80 | 80 | NT | 100 | 100 | NT | NT | NT | NT | + |

References at end of table.

TABLE V—Continued

| Example | TSM | GPA* | PA | BB | AW | BW | HF Percent KD | HF Percent kill | GR | FB | GW | BCB, percent feeding | Nema, +,− control |
|---|---|---|---|---|---|---|---|---|---|---|---|---|---|
| 77 | 100 | 100 | 100 | 100 | 100 | NT | 100 | 100 | NT | NT | NT | NT | − |
| 78 | 100 | 8/9 | 100 | 100 | 100 | NT | 100 | 100 | NT | NT | NT | NT | − |
| 79 | 100 | 83 | 100 | 90 | 100 | NT | 95 | 100 | NT | NT | NT | NT | − |
| 80 | 100 | 64 | 100 | 80 | 80 | NT | 10 | 100 | NT | NT | NT | NT | − |
| 81 | 100 | 100 | 100 | 100 | 100 | NT | 100 | 100 | NT | NT | NT | NT | + |
| 82 | 100 | 100 | 100 | 60 | 90 | NT | 100 | 100 | NT | NT | NT | NT | + |
| 83 | 0 | 5/7 | 0 | 10 | 0 | NT | 0 | 50 | NT | NT | NT | NT | − |
| 84 | 0 | 100 | 61 | 0 | 0 | NT | 0 | 10 | NT | NT | NT | NT | − |
| 85 | 100 | 100 | 100 | 100 | 100 | NT | 100 | 100 | NT | NT | NT | NT | − |
| 86 | 100 | 95 | 100 | 30 | 100 | NT | 100 | 100 | NT | NT | NT | NT | − |
| 87 | 100 | 100 | 100 | 80 | 100 | NT | 100 | 100 | NT | NT | NT | NT | − |
| 88 | 100 | 100 | 100 | 100 | 60 | NT | 100 | 100 | NT | NT | NT | NT | − |
| 89 | 100 | 100 | 100 | 100 | 100 | NT | 100 | 100 | NT | NT | NT | NT | NT |
| 90 | 99 | 85 | 100 | 100 | 100 | 80 | 100 | 100 | NT | NT | NT | NT | − |
| 91 | 100 | 3/5 | NT | 50 | 100 | 90 | 40 | 100 | NT | NT | NT | NT | − |
| 92 | 100 | 100 | 100 | 90 | 100 | 90 | 40 | 100 | NT | NT | NT | NT | − |
| 93 | 100 | 100 | 100 | 100 | 100 | 100 | 75 | 100 | NT | NT | NT | NT | − |
| 94 | 100 | 100 | 100 | 100 | 90 | 100 | 100 | 100 | NT | NT | NT | NT | − |
| 95 | 100 | 100 | 100 | 90 | 100 | 100 | 100 | 100 | NT | NT | NT | NT | − |
| 96 | 99 | 100 | NT | 100 | 100 | NT | 100 | 100 | NT | NT | NT | NT | − |
| 97 | 100 | 100 | NT | 100 | 100 | NT | 100 | 100 | NT | NT | NT | NT | − |
| 98 | 100 | 97 | 95 | 100 | 100 | 90 | 100 | 100 | NT | NT | NT | NT | − |
| 99 | 100 | 89 | 100 | 80 | 100 | 100 | 20 | 100 | NT | NT | NT | NT | − |
| 100 | 100 | 100 | 100 | 100 | 100 | 100 | 100 | 100 | NT | NT | NT | NT | − |
| 101 | 99 | 100 | 100 | 90 | 80 | 100 | 100 | 100 | NT | NT | NT | NT | − |
| 102 | 100 | 98 | 100 | 90 | 100 | 100 | 65 | 100 | NT | NT | NT | NT | + |
| 103 | 100 | 3/3 | 100 | 90 | 100 | 100 | 40 | 100 | NT | NT | NT | NT | + |
| 104 | 100 | 100 | 100 | 100 | 100 | 100 | 20 | 100 | NT | NT | NT | NT | − |
| 105 | 100 | 100 | NT | 100 | 100 | 100 | 100 | 100 | NT | NT | NT | NT | − |
| 106 | 100 | 86 | NT | 90 | 60 | 100 | 100 | 100 | NT | NT | NT | NT | − |
| 107 | 100 | 100 | 100 | 100 | 100 | 100 | 100 | 100 | NT | NT | NT | NT | − |
| 108 | 100 | 5/8 | 91 | 70 | 100 | 100 | 10 | 100 | NT | NT | NT | NT | NT |
| 109 | 100 | 100 | 100 | 100 | 100 | 100 | 80 | 100 | 100 | 100 | 100 | 0 | − |
| 110 | 100 | 100 | NT | 50 | 0 | 100 | 0 | 0 | 10 | 100 | 100 | 100 | − |
| 111 | 100 | 100 | 100 | 100 | 90 | 100 | 95 | 100 | 0 | 10 | 100 | 0 | − |
| 112 | 100 | 100 | d100 | 100 | 100 | 100 | 100 | 100 | 100 | 100 | 100 | 0 | − |
| 113 | 100 | 100 | e100 | 100 | 100 | 100 | 100 | 100 | 20 | 100 | 100 | 0 | − |
| 114 | 100 | 94 | 100 | 100 | 70 | 100 | 100 | 100 | 20 | 100 | 100 | 0 | − | a = Percent kill at 300 p.p.m.
b = Percent kill at 150 p.p.m.
c = percent kill at 38 p.p.m.
d = Percent kill at 10 p.p.m.; NT=Not tested; KD=Knockdown.
*A value is sometimes given as dead aphids/total aphids.

Ovicidal and larvacidal tests were conducted on representative compounds of this invention.

For mite tests involving the two-spotted mite ova and larvae, bean leaf sections containing about 100 eggs were placed on moistened cotton in a Petri dish and sprayed on the turntable with the 600 p.p.m. test solution described above. These were held for 6 days and examined under the microscope. Unhatched eggs and dead and live larvae were counted and the percent ovicidal and the percent larvacidal activity were determined.

For tests on house fly larvae, two layers of 4.25 cm. filter papers were placed in small Petri dishes, were sprayed on the turntable with a 600 p.p.m. solution of the test compound and were air dried. About 100 eggs of the house fly in about 1 ml. of water were pipetted onto the filter paper and the dishes covered. These were held for 24 hours and examined under the microscope. The percent kill values for larvae were determined.

A second technique for determining house fly larvacidal activity involved incorporation of a test solution into a standard fly media to attain specified concentrations on a weight basis, usually 2 p.p.m. About 100 house fly eggs were pipetted into a jar containing 50 g. of moistened treated media in an 8 oz. jar. The jars were covered with cheese cloth, held for 5 days and the percent control relative to untreated checks determined.

For tests involving the southern corn rootworm (Diabrotica undecimpunctata howardi) ova and larvae, the same technique as described above for house fly larvae by the turntable method was used. The holding period was 6 days. Unhatched eggs and dead and live larvae were counted under the microscope and the percent ovicidal and the percent larvacidal activity were determined.

Mosquito (Culex spp.) larvae tests were obtained as follows. Approximately 25 6-day-old larvae were introduced into one-third pint squat dishes containing 100 ml. of water which previously had been treated with a test solution of selected compounds so as to give a 1 p.p.m. concentration. Twenty-four hours later the percent kill was determined.

Table VI gives the results of these ovicidal and larvacidal tests.

TABLE VI.—OVICIDAL AND LARVACIDAL EVALUATIONS

| | Percent kill | | | | | | |
|---|---|---|---|---|---|---|---|
| | TSMa at 600 p.p.m. | | CRWb at 600 p.p.m. | | HFc larvae | | Mosquito larvae, 1 p.p.m |
| Example | Ova | Larvae | Ova | Larvae | Filter paper, 600 p.p.m. | Media 1 p.p.m. | |
| 1 | 0 | 100 | 0 | 93 | 100 | 98 | 100 |
| 3 | 0 | 0 | 0 | 74 | 95 | 0 | NT |
| 4 | 0 | 100 | 0 | 77 | 100 | 100 | 100 |
| 5 | 0 | 100 | 0 | 78 | 100 | 88 | 100 |
| 6 | 0 | 28 | 0 | 0 | 90 | 0 | NT |
| 7 | 0 | 0 | 0 | 0 | 0 | NT | NT |
| 8 | 0 | 100 | 0 | 100 | 100 | 100 | NT |
| 9 | 0 | 100 | 36 | 96 | 100 | 93 | 100 |
| 11 | 0 | 100 | 0 | 93 | 100 | 100 | 100 |

References at end of table.

TABLE VI.—Continued

| | \multicolumn{2}{c}{TSM$^a$ at 600 p.p.m.} | | CRW$^b$ at 600 p.p.m. | | HF$^c$ larvae | | Mosquito larvae, 1 p.p.m |
|---|---|---|---|---|---|---|---|
| Example | Ova | Larvae | Ova | Larvae | Filter paper, 600 p.p.m. | Media 1 p.p.m. | |
| 12 | 0 | 100 | 34 | 89 | 100 | 26 | 95 |
| 16 | 0 | 100 | 49 | 100 | 100 | 99 | 100 |
| 17 | 0 | 100 | 43 | 86 | 100 | 93 | NT |
| 18 | 0 | 100 | 0 | 98 | 100 | 100 | NT |
| 10 | 100 | — — — | 0 | 100 | 100 | 86 | NT |
| 19 | 0 | 100 | 45 | 100 | 100 | 45 | NT |
| 20 | 0 | 100 | 70 | 100 | 100 | 100 | 100 |
| 21 | 0 | 100 | 23 | 100 | 100 | 11 | NT |
| 24 | 0 | 100 | 0 | 100 | 100 | 0 | NT |
| 25 | 0 | 100 | 66 | 77 | 100 | 0 | 100 |
| 26 | 0 | 100 | 37 | 100 | 100 | 9 | 100 |
| 27 | 0 | 100 | 33 | 100 | 100 | 100 | NT |
| 28 | 0 | 100 | 0 | 0 | 100 | 0 | NT |
| 29 | 0 | 100 | 0 | 100 | 100 | 0 | NT |
| 31 | 100 | — — — | 0 | 95 | 100 | 99 | 100 |
| 32 | 0 | 100 | 0 | 100 | 100 | 37 | NT |
| 33 | 100 | — — — | 0 | 83 | 100 | 100 | 100 |
| 34 | 100 | — — — | 0 | 100 | 100 | 81 | 100 |
| 35 | 0 | 100 | 0 | 100 | 100 | 80 | NT |
| 36 | 0 | 79 | 0 | 90 | 100 | 100 | 100 |
| 37 | 0 | 100 | 0 | 97 | 100 | 100 | NT |
| 38 | 0 | 100 | 0 | 100 | 100 | 95 | 100 |
| 39 | 0 | 100 | 0 | 89 | 100 | 60 | 100 |
| 40 | 0 | 100 | 67 | 70 | 100 | 17 | NT |
| 42 | 0 | 100 | 0 | 91 | 100 | 23 | 100 |
| 43 | 0 | 97 | 0 | 100 | 100 | 0 | NT |
| 44 | 0 | 100 | 0 | 100 | 100 | 0 | NT |
| 50 | 0 | 100 | 51 | 100 | 100 | 0 | NT |
| 51 | 0 | 100 | 20 | 70 | 100 | 14 | NT |
| 52 | 0 | 94 | 0 | 79 | 100 | NT | NT |
| 53 | 0 | 100 | 0 | 0 | 100 | NT | NT |
| 54 | 0 | 100 | 0 | 100 | 100 | 100 | NT |
| 55 | 0 | 100 | 0 | 95 | 100 | 16 | NT |
| 56 | 0 | 100 | 39 | 73 | 100 | 24 | NT |
| 57 | 0 | 100 | 40 | 58 | 100 | 33 | NT |
| 58 | 0 | 100 | 0 | 100 | 100 | 0 | NT |
| 68 | 0 | 0 | 0 | 100 | 100 | NT | NT |
| 69 | 0 | 74 | 0 | 86 | + | NT | NT |
| 70 | 0 | 88 | 0 | 0 | 100 | NT | NT |
| 71 | 0 | 59 | 0 | 0 | 60 | NT | NT |
| 73 | 0 | 100 | 0 | 91 | 100 | 0 | NT |
| 74 | 0 | 97 | 0 | 62 | 100 | 0 | NT |
| 109 | 0 | 100 | 0 | 100 | 100 | 41 | NT |
| 110 | 0 | 0 | 0 | 0 | 76 | NT | NT |
| 111 | 0 | 100 | 0 | 95 | 100 | 100 | NT |
| 112 | 0 | 100 | 0 | 100 | 100 | 100 | NT |
| 113 | 0 | 100 | 0 | 100 | 100 | 99 | NT |
| 114 | 0 | 100 | 0 | 100 | 100 | 100 | NT |

$^a$=Two-spotted mite.
$^b$=Corn rootworm.
$^c$=House fly.
NOTE.—NT=Not tested.
+=Affected but not quite moribund.
— — —=Data not possible, all eggs destroyed.

Tests designed to determine systemic activity of representative compounds of this invention were conducted. These were soil drench assays.

In one such test involving the two-spotted mite (TSM), a bean seedling consisting of two primary leaves planted in a 3″ diameter plastic pot containing 200 ml. of a 50:50 soil-sand mixture was used. The pot was placed in a Petri dish lid and a 10 ml. volume of the test solution containing 600 p.p.m. of the test compound was pipetted onto the soil to give a 30 p.p.m. concentration in the soil. Twenty-four hours later each leaf was infested with bean leaf sections containing about 50 adult female mites. The plant was then held for 48 hours and the percent kill determined via microscopic examination.

A similar test using the green peach aphid (GPA) was conducted except that a broccoli plant consisting of 3–5 leaves was used instead of the bean plant. The percent kill was determined based upon the population present on the plant foliage. An untreated plant would generally have more than 100 aphids per plant. In some instances a toxic material may induce affected aphids to drop from the plant so that a low population would be observed after the 48 hours holding period. In such cases dead and total aphids on the plant were reported.

A similar test was conducted using the pea aphid (PA) as the test insect. The plant used was a broad bean plant pruned to two leaves. The plant was held in a plastic box and infested by brushing approximately 100 aphids into the box. The percent kill was determined 48 hours later.

Similar systemic tests were also conducted using Mexican bean beetle (BB) and armyworm (AW) as the test insects. The same type of bean plant as used in the mite test above was used for these. After the 24-hour translocation period, the plant was infested with 10 third instar larvae of either the bean beetle or the armyworm, and then held for 72 hours after which the percent kill was determined.

Similar tests were conducted on the mite and insects except that the translocation period prior to infestation was seven days.

Table VII gives the results of the above-described systemic tests for representative examples.

TABLE VII.—SYSTEMIC EVALUATIONS BY THE SOIL DRENCH METHOD

| Example | Translocation period (days) | Percent kill (30 p.p.m. in soil) of— | | | | |
|---|---|---|---|---|---|---|
| | | TSM | GPA* | PA | BB | AW |
| 4 | 1 | 100 | 100 | b100 | b100 | b0 |
| | 7 | b97 | NT | b100 | b40 | b0 |
| 9 | 1 | 100 | 100 | a100 | a67 | a0 |
| | 7 | c100 | a100 | a100 | a90 | a50 |
| 17 | 1 | 100 | 100 | d54 | b90 | a100 |
| | 7 | d100 | d0/4 | d83 | b100 | a90 |
| 28 | 1 | 100 | 1/12 | 25 | a0 | a0 |
| | 7 | 0 | 0 | 69 | a0 | a0 |
| 33 | 1 | 100 | 100 | a0 | a90 | a0 |
| | 7 | b100 | b0/15 | a100 | a100 | a0 |
| 36 | 1 | 100 | 100 | a100 | a90 | a10 |
| | 7 | a96 | NT | a100 | a90 | a20 |
| 43 | 1 | 100 | 0/8 | 100 | a90 | a0 |
| | 7 | d0 | 0/0 | 100 | a70 | a0 |
| 52 | 1 | 100 | a0 | a100 | a100 | a80 |
| | 7 | NT | a0/7 | a80 | a50 | a10 |
| 55 | 1 | 37 | 0 | a0 | a0 | a0 |
| | 7 | a0 | a0 | a0 | a0 | a0 |
| 56 | 1 | 33 | 0 | 30 | 0 | 0 |
| | 7 | 4 | 0 | 30 | NT | NT |
| 58 | 1 | 0 | 0 | NT | NT | NT |
| | 7 | NT | NT | NT | NT | NT |
| 68 | 1 | 0 | 0 | NT | NT | NT |
| | 7 | NT | NT | NT | NT | NT |
| 71 | 1 | 100 | 90 | a92 | a80 | a10 |
| | 7 | a100 | a100 | a100 | a90 | a60 |
| 73 | 1 | 89 | 0/3 | a0 | a0 | a0 |
| | 7 | a0 | a0 | a92 | a0 | a0 |
| 74 | 1 | 99 | 0 | a86 | a10 | a0 |
| | 7 | c64 | a0 | a0 | a0 | a0 |
| 112 | 1 | 100 | 100 | b100 | a80 | a0 |
| | 7 | b0 | b0 | b14 | a0 | a0 |
| 113 | 1 | 100 | 100 | 87 | a80 | a0 |
| | 7 | b0 | 0/7 | 35 | a60 | a0 |
| 114 | 1 | 100 | 75 | b51 | b70 | b0 |
| | 7 | c0 | b0 | b0 | b0 | b0 | a=300 p.p.m. solution=15 p.p.m. soil.
b=150 p.p.m. solution=7.5 p.p.m. soil.
c=75 p.p.m. solution=3.8 p.p.m. soil.
d=38 p.p.m. solution=1.9 p.p.m. soil.
*A value is sometimes given as dead aphids/total aphids.
NOTE.—NT=not tested.

Residual studies were made to determine the stability of representative phosphorylthio acrylamides on sprayed foliage or inert surfaces. Such test plants or inert surfaces appropriate to the organism involved were sprayed with the test solution containing 1200 or 600 p.p.m. of the phosphorylthio acrylamide. The plants were then maintained under proper growing conditions for 7 days and for 14 days after which they were infested with the test organism. The sprayed inert surfaces were stored a similar period of time after which they were infested with the appropriate test organism.

For the two-spotted mite test, a bean plant was used and infested from a parent colony so that about 50 mites were placed on each bean leaf. Percent kills were determined 48 hours thereafter.

For the green peach aphid test, a broccoli plant was used and infested from a parent colony with 50–100 aphids. Percent kills were determined 48 hours thereafter.

For the pea aphid test, a broad bean plant was used and this was infested with 50–100 aphids. Percent kills were determined 48 hours thereafter.

For the bean beetle and armyworm tests, bean plants were used. Prior to infestation the bean plants were severed from the roots and the stems immersed in narrow-necked 2-oz. bottles using cotton plugs when necessary to fill in a void between the stem and the neck. For each test 20 third instar larvae of the bean beetle or the armyworm were used. Percent kills were determined 72 hours thereafter.

For the boll weevil, house fly, cockroach, flour beetle and granary weevil tests the same procedures as used in the initial tests described above for Table V were used except that the open jars or dishes were sprayed followed by an ageing period of 7 or 14 days before introduction of the insects and covering with screened lids. Percent kills were determined 48 hours thereafter.

Table VIII gives the results on these residual studies on representative compounds of this invention.

TABLE VIII.—RESIDUAL INSECT AND MITE EVALUATIONS

| Example | Ageing period (days) | Percent kill at (600 p.p.m.) of— | | | | | | | | | |
|---|---|---|---|---|---|---|---|---|---|---|---|
| | | TSM | GPA* | PA | BB | AW | BW | HF | GR | FB | GW |
| 4 | 7 | 100 | NT | 100 | 90 | a100 | a100 | 100 | 90 | 95 | 100 |
| | 14 | 100 | NT | 90 | 45 | 20 | 60 | 100 | 100 | 98 | 10 |
| 9 | 7 | 100 | 0/4 | 100 | 100 | 25 | 100 | 100 | 10 | 100 | 100 |
| | 14 | 52 | NT | 100 | 90 | 0 | 80 | 100 | 20 | 82 | 100 |
| 17 | 7 | 100 | 100 | 100 | 100 | 100 | 100 | 100 | 50 | 100 | 100 |
| | 14 | 100 | NT | 100 | 100 | 90 | 100 | 100 | 30 | 100 | 100 |
| 28 | 7 | a100 | 0/8 | a97 | 100 | 0 | a0 | a100 | a0 | a0 | a0 |
| | 14 | a98 | NT | a0 | 10 | a0 | a0 | a90 | NT | a0 | a0 |
| 33 | 7 | 100 | a0/2 | 100 | a90 | 50 | 100 | 100 | 100 | 100 | 100 |
| | 14 | 96 | NT | a100 | 95 | 0 | 100 | 100 | 80 | a100 | a100 |
| 36 | 7 | 100 | NT | 100 | 100 | a100 | 100 | 100 | 100 | 100 | 100 |
| | 14 | 100 | NT | a100 | 70 | 75 | 100 | 100 | 80 | 100 | 100 |
| 43 | 7 | a100 | a0/5 | a95 | 75 | a0 | a0 | 100 | a10 | a0 | 36 |
| | 14 | a28 | NT | a0 | 20 | NT | a0 | a100 | NT | a0 | a0 |
| 52 | 7 | 100 | a100 | 100 | 95 | 100 | 100 | 100 | 0 | 100 | 100 |
| | 14 | a100 | a100 | a100 | a95 | 35 | 90 | a100 | a60 | 100 | 100 |
| 55 | 7 | 100 | a0 | 80 | 100 | a5 | 30 | 100 | a0 | 0 | 0 |
| | 14 | 100 | NT | 0 | a95 | NT | a20 | 55 | NT | 0 | 0 |
| 56 | 7 | 95 | 0 | 10 | a85 | a85 | a70 | a100 | NT | NT | NT |
| | 14 | 78 | 0 | NT | a85 | a50 | a0 | a100 | NT | NT | NT |
| 58 | 7 | 97 | a0 | 80 | 55 | 0 | 0 | a30 | NT | NT | NT |
| | 14 | NT | NT | NT | NT | NT | NT | NT | NT | NT | NT |
| 71c | 7 | 89 | a0 | 100 | 75 | 75 | 100 | 100 | 40 | 100 | 100 |
| | 14 | 0 | a0 | 75 | 95 | 10 | 100 | a100 | 50 | a100 | a100 |

References at end of table.

TABLE VIII—Continued

| Example | Ageing period (days) | Percent kill at (600 p.p.m.) of— | | | | | | | | | |
|---|---|---|---|---|---|---|---|---|---|---|---|
| | | TSM | GPA* | PA | BB | AW | BW | HF | GR | FB | GW |
| 73 | 7 | 100 | 0 | 88 | 65 | 80 | 30 | 100 | 0 | 30 | 100 |
|  | 14 | 69 | ᵃ0 | 0 | 35 | ᵃ60 | 0 | 100 | ᵃ10 | ᵃ67 | ᵃ100 |
| 74 | 7 | 100 | 0 | 100 | 90 | 0 | 30 | 100 | ᵃ0 | 100 | 100 |
|  | 14 | 100 | ᵃ0 | NT | ᵃ50 | 0 | 0 | 100 | ᵃ0 | ᵃ100 | ᵃ100 |
| 112 | 7 | ᵃ0 | ᵃ0/4 | ᵃ33 | 0 | 0 | 100 | 100 | ᵃ100 | 100 | 100 |
|  | 14 | ᵃ15 | NT | ᵃ0 | 0 | 0 | ᵃ100 | ᵃ100 | ᵃ50 | ᵃ100 | ᵃ100 |
| 113 | 7 | ᵃ100 | ᵃ0 | ᵃ42 | 95 | 0 | 100 | 100 | ᵃ30 | 100 | 100 |
|  | 14 | ᵃ79 | NT | ᵃ42 | 100 | 0 | ᵃ100 | ᵃ100 | ᵃ10 | ᵃ100 | ᵃ100 |
| 114 | 7 | 100 | 0 | 96 | 80 | 0 | 80 | 100 | 0 | 100 | 100 |
|  | 14 | 95 | ᵃ0 | 0 | 75 | 0 | 80 | 100 | ᵃ0 | 100 | 100 |

ᵃ=1,200 p.p.m.
*A value is sometimes given as dead aphids/total aphids.
NOTE.—NT=not tested.

Representative compounds of this invention were found to give good to excellent control of the adult female chicken mite (*Dermanyssus gallinae*). In this test individual Petri dishes were sprayed with the test compound using solutions containing 300, 75, 20, 5, 1.2 or 0.3 p.p.m. and allowed to dry. Approximately 25 to 40 engorged mites, predominantly female, were introduced into each dish. The dishes were held for 48 hours at which time the percent mortality was determined by counting the dead and moribund mites. The following Table IX gives the lowest level of the spray concentration which gave a 90-100% mortality. For many of the compounds oviposition has been found to be adversely affected.

TABLE IX.—CHICKEN MITE DATA

| Example | Lowest concentration (p.p.m.) giving 90-100% mortality | Example | Lowest concentration (p.p.m.) giving 90-100% mortality |
|---|---|---|---|
| 1 | 1.2 | 38 | 5 |
| 4 | 20 | 39 | 5 |
| 5 | 20 | 42 | 5 |
| 6 | 300 | 43 | 5 |
| 8 | 5 | 44 | 5 |
| 9 | 1.2 | 50 | 20 |
| 12 | 5 | 51 | 5 |
| 16 | 1.2 | 52 | 20 |
| 17 | 5 | 53 | 75 |
| 18 | 1.2 | 54 | 1.2 |
| 19 | 1.2 | 55 | 75 |
| 20 | 1.2 | 56 | 20 |
| 21 | 5 | 57 | 300 |
| 24 | 75 | 58 | 20 |
| 27 | 5 | 69 | 75 |
| 29 | 5 | 71 | 75 |
| 31 | 20 | 73 | 20 |
| 32 | 5 | 109 | 5 |
| 33 | 0.3 | 111 | 5 |
| 34 | 1.2 | 112 | 1.2 |
| 35 | 5 | 113 | 1.2 |
| 36 | 1.2 | 114 | 5 |
| 37 | 1.2 | | |

Representative compounds of this invention were tested on the chicken body louse (*Menacanthus stramineus*). In this test eight week old White Leghorn cockerels were exposed to a colony of the lice three weeks prior to the test period. At the start of the test a subjective count of the lice infestation was made on each bird by two separate counts in five locations, namely the vent, back, neck, breast and under the wings. The birds were then sprayed with the test compound at three dosage levels (1000, 125 and 15 p.p.m.), using two birds for each treatment level, and allowed to dry. The birds were then held in individual cages for two weeks, then a louse count was made in the same manner as described above and a percent control determined. Table X gives the results.

TABLE X.—CHICKEN BODY LOUSE DATA

| Example | Percent control for, p.p.m. of— | | |
|---|---|---|---|
| | 1,000 | 125 | 15 |
| 1 | 100 | 100 | 87 |
| 9 | 100 | 100 | 100 |
| 16 | 100 | 100 | 71 |
| 18 | 100 | 100 | 100 |
| 19 | 100 | 100 | 100 |
| 20 | 100 | 100 | 100 |
| 33 | 100 | 100 | 100 |
| 36 | 100 | 100 | 100 |
| 37 | 100 | 100 | 100 |
| 111 | 100 | 100 | 100 |
| 112 | 100 | 100 | 98 |
| 113 | 100 | 100 | 88 |
| 114 | 100 | 100 | 37 |

The 3-dialkoxyphosphorylthio- and 3-dialkoxythionophosphorylthio-acrylamides, methacrylamides and related structures of this invention possess general utility as arthropodicides, in particular against members of the class Arachroidea, which includes the order Acarina, as represented by mites and ticks, and Insecta, the insects. Compounds of this invention also have utility as nematocides. Such utilities enable protection of plants and animals, including man, from the ravages of harmful and/or annoying pests or disease organisms which they may carry. Application of said compounds may be made directly to the loci of those pests to be controlled or to the loci to be protected. For example, food, fiber, forage, forest, and ornamental crops and stored products thereof would represent plant protection loci. Treatment with compounds of this invention of domestic animals, man and their immediate environs similarly constitute representative loci for protection against various annoying ectoparsitic or endoparasitic Acarina (Acari) and Insecta. Accordingly, compounds of the present invention provide utility as the essential active ingredient of pesticdal compositions suitable for agricultural and sanitary purposes.

For use as pesticides the compounds of this invention may be used as solutions in organic solvents or formulations. For example they may be formulated as wettable powders, emulsifiable concentrates, dusts, granular formulations or flowable emulsifiable concentrates. In such formulations the phosphorylthio acrylamides are extended with an agronomically aceptable liquid or solid carrier and, when desired, suitable surfactants are likewise incorporated. Surfactants commonly used in the art may be found in the John W. McCutcheon, Inc. publication "Detergents and Emulsifiers 1969 Annual."

The phosphorylthio acrylamides may be taken up on or mixed with a finely particled solid carrier, as for example clays, inorganic silicates, carbonates, and silicas. Organic carriers may also be employed. Dust concentrates are commonly made wherein phosphorylthio acrylamides are present in the range of 20 to 80%. For ultimate applications, these concentrates are normally extended with additional solid to give an active ingredient content of from about 1 to 20%. Granular formulations are made using a granular or pelletized form of carrier, such as granular clays, vermiculite, charcoal or corn cobs, and may contain the active ingredient in from 1 to 25% by weight.

Wettable powder formulations are made by incorporating the compounds of this invention in an inert, finely divided solid carrier along with a surfactant which may be one or more emulsifying, wetting, dispersing or spreading agents or blend of these. The phosphorylthio acrylamides are usually present in the range of 10 to 80% by weight and surfactants in from 0.5 to 10% by weight.

One convenient method for preparing a solid formulation is to impregnate the phosphorylthio acrylamide toxicant onto the solid carrier by means of a volatile solvent, such as acetone. In this manner, adjuvants, such as activators, adhesives, plant nutrients, synergists and various surfactants may also be incorporated.

Emulsifiable concentrate formulations may be prepared by dissolving the phosphorylthio acrylamides of this invention in an agronomically acceptable organic solvent and adding a solvent-soluble emulsifying agent. Suitable solvents are usually water-immiscible and may be found in the hydrocarbon, chlorinated hydrocarbon, ketone, ester, alcohol and amide classes of organic solvents. Mixtures of solvents are commonly employed. The surfactants useful as emulsifying agents may constitute about 0.5 to 10% by weight of emulsifiable concentrate and may be anionic, cationic or non-ionic in character. The concentration of the active ingredients may vary from 10 to 80%, preferably in the range of 25 to 50%.

For use as biocidal agents, these compounds should be applied in an effective amount sufficient to exert the desired biocidal activity by techniques well known in the art. Usually, this will involve the application of the phosphorylthio acrylamides to the loci to be protected or eradicated in an effective amount when incorporated in an agronomically acceptable carrier. However, in certain situations it may be desirable and advantages to apply the compounds directly onto the loci to be protected or eradicated without the benefit of any substantial amount or carrier. This is a particularly effective method when the physical nature of the toxicants is such as to permit what is known as "low-volume" application, that is, when the compounds are in liquid form or substantially soluble in higher boiling solvents.

The application rate will, of course, vary depending upon the purposes for such application, the phosphorylthio acrylamides being utilized, the frequency of dissemination and the like.

Many of the above formulations can be utilized on animals and birds for the control of animal parasites.

For use as insecticides and miticides, dilute sprays may be applied at concentrations of 0.001 to 20 pounds of the active phosphorylthio acrylamide ingredient per 100 gallons of spray. They are usually applied at 0.01 to 5 pounds per 100 gallons and preferably at 0.03 to 1 pound per 100 gallons. In more concentrated sprays, the active ingredient is increased by a factor of 2 to 12. With dilute sprays, applications are usually made to the plants until run-off is achieved, whereas with more concentrated or low-volume sprays the materials are applied as mists.

For use as a nematocide or as a soil or systemic insecticide, the phosphorylthio acrylamides may be applied as a solid formulation, preferably a granular formulation, by broadcasting, by side-dressing, by soil incorporation or by seed treatment. The application rate may amount to from 1 to 50 pounds per acre. For soil incorporation the compounds of this invention may be mixed with the soil at a rate of 2 to 100 p.p.m.

The compounds of this invention may be utilized as the sole biocidal agents or they may be employed in conjunction with other bactericides, fungicides, herbicides, insecticides, miticides and comparable pesticides.

We claim:
1. A compound of the formula

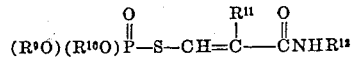

wherein
R$^9$ and R$^{10}$ are individually methyl or ethyl,
R$^{11}$ is hydrogen or methyl, and
R$^{12}$ is
  (a) alkyl of 1 to 5 carbon atoms, or
  (b) the —C(O)R$^8$ group wherein R$^8$ is
    (1) hydrogen,
    (2) alkyl of 1 to 5 carbon atoms,
    (3) alkyl of 1 to 5 carbon atoms substituted with halogen, thiocyano, alkoxy of 1 to 5 carbon atoms, alkylthio of 1 to 5 carbon atoms, C$_1$ to C$_5$ alkoxy carbonyl, thioacetyl, benzyloxy, benzylthio, phenyl, phenoxy, or phenylthio,
    (4) alkenyl of 2 to 5 carbon atoms,
    (5) alkenyl of 2 to 5 carbon atoms substituted with C$_1$ to C$_5$ alkoxy carbonyl,
    (6) alkoxy of 1 to 5 carbon atoms,
    (7) C$_1$ to C$_5$ alkoxy carbonyl, or
    (8) phenyl.

2. A compound according to claim 1 wherein R$^9$ and R$^{10}$ are methyl.
3. A compound according to claim 2 wherein R$^{11}$ is hydrogen.
4. A compound according to claim 3 wherein R$^{12}$ is methoxyacetyl.
5. A compound according to claim 3 wherein R$^{12}$ is methylthioacetyl.
6. A compound according to claim 3 wherein R$^{12}$ is benzyloxyacetyl.
7. A compound according to claim 3 wherein R$^{12}$ is benzylthioacetyl.
8. A compound according to claim 3 wherein R$^{12}$ is alkyl of 1 to 5 carbon atoms.
9. The compound according to claim 3 wherein R$^{12}$ is ethyl.
10. The compound according to claim 1 wherein R$^9$, R$^{10}$ and R$^{11}$ are methyl and R$^{12}$ is ethyl.
11. The compound of the formula:

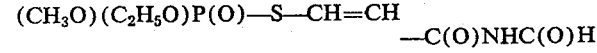

References Cited
UNITED STATES PATENTS

| | | | |
|---|---|---|---|
| 2,943,975 | 7/1960 | Metivier | 260—943 XR |
| 3,053,729 | 9/1962 | Sun | 260—943 XR |

FOREIGN PATENTS

| | | | |
|---|---|---|---|
| 636 | 1/1965 | Japan | 260—943 |

ANTON H. SUTTO, Primary Examiner

U.S. Cl. X.R.

260—247.1, 293.85, 302 A, 326.82 454, 455 P, 938, 940, 968, 969, 978, 986, 989; 424—200, 211